(12) United States Patent
Ooshima

(10) Patent No.: US 6,325,093 B1
(45) Date of Patent: Dec. 4, 2001

(54) WATER DISTRIBUTING INSTALLATION CONTROLLERS

(75) Inventor: Nobuo Ooshima, Tokyo (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 0 days.

(21) Appl. No.: 08/926,020

(22) Filed: Sep. 9, 1997

(30) Foreign Application Priority Data

Sep. 12, 1996 (JP) .................................................. 8-240895
Apr. 9, 1997 (JP) .................................................. 9-090368

(51) Int. Cl.[7] ........................... F04B 41/06; G06F 17/60; F16K 31/02
(52) U.S. Cl. ................. 137/392; 137/487.5; 137/565.33; 137/624.11; 239/69; 417/3; 417/5; 417/36; 417/45; 700/28; 700/44
(58) Field of Search .......................... 137/392, 487.5, 137/565.33, 624.11; 239/69; 364/148.01, 528.17; 700/2, 28, 44; 417/3, 4, 5, 6, 36, 42, 43, 44.1, 44.11, 45

(56) References Cited

U.S. PATENT DOCUMENTS

| | | | |
|---|---|---|---|
| 4,200,911 | 4/1980 | Matsumoto | 700/28 |
| 4,545,396 * | 10/1985 | Miller et al. | 239/69 |
| 4,569,012 * | 2/1986 | Sekozawa et al. | 700/44 |
| 4,637,547 * | 1/1987 | Hiniker et al. | 239/69 |
| 4,867,192 * | 9/1989 | Terrell et al. | 239/69 |
| 4,895,303 * | 1/1990 | Freyvogel | 239/69 |
| 4,987,913 | 1/1991 | Kodate et al. | 137/1 |
| 5,023,787 * | 6/1991 | Evelyn-Veere | 239/69 |
| 5,056,554 * | 10/1991 | White | 137/487.5 |
| 5,229,937 * | 7/1993 | Evelyn-Veere | 239/69 |
| 5,441,070 * | 8/1995 | Thompson | 137/487.5 |
| 5,448,476 * | 9/1995 | Kurokawa et al. | 702/2 |
| 5,566,709 * | 10/1996 | Fujii et al. | 137/487.5 |
| 5,653,389 * | 8/1997 | Henderson et al. | 239/69 |

FOREIGN PATENT DOCUMENTS

| | | |
|---|---|---|
| 2 651 687 | 3/1991 | (FR) . |
| 1026172 | 4/1966 | (GB) . |
| 2 260 424 | 4/1993 | (GB) . |

OTHER PUBLICATIONS

"Plan and Description of Water–Supply Installations", 369 (1990).

* cited by examiner

Primary Examiner—George L. Walton
(74) Attorney, Agent, or Firm—Foley & Lardner

(57) ABSTRACT

A water distributing installation controller includes water pumps for supplying clear water from a filtration plant to a distributing reservoir, a level gauge for measuring the water level of the distributing reservoir, a first flow meter for measuring the water supply directed thereto, a second flow meter for measuring the water delivery directed to a distributing area, a pumps-number control part for controlling the number of pumps operated, and a short-term demand prediction part for providing short-term demand prediction data on the water delivery to the pumps-number control part at the request thereof.

9 Claims, 23 Drawing Sheets

WATER DISTRIBUTING INSTALLATION CONTROLLERS

BACKGROUND OF THE INVENTION

The present invention relates to water distributing installation controllers for controlling distributing reservoirs in water-supply installations.

Distributing reservoirs serve to receive water from filtration plants and distribute it to a distributing area in accordance with a demand thereof. The distributing reservoirs need to provide the function of adjusting temporal variations in the water delivery and the function of maintaining a predetermined water quantity and pressure even upon an accident which occurs upstream thereof, etc. As for the distributing reservoirs, refer to Plan and Description of Water-Supply Installations, page 369, 1990 edition, compiled under the supervision of the Ministry of Welfare. On the other hand, due to its operation based on the estimated maximum one-day water consumption, the filtration plants supply to the distributing reservoirs a given quantity of clear water per hour. Control of the distributing reservoirs needs to satisfy the above two requirements in the well-balanced way. Typical examples of this control are control at the constant water level and control at a target water level set every hour.

FIG. 21 shows a water distributing installation wherein known distributing-reservoir water-level control is applied to pumps-number control. Referring to FIG. 21, a distributing reservoir 1 is provided with a level gauge 2 for measuring the level of water therein. Water pumps 3 are arranged to supply water from a clear-water reservoir to the distributing reservoir 1. The water pumps 3 are controlled by a pump start/stop command derived from a pumps-number control part 4. The pumps-number control part 4 determines the number of pumps 3 operated by a signal derived from the level gauge 2. 5 designates a duct network of a distributing area.

With the water distributing installation having the above structure, when the water level of the distributing reservoir 1 is higher than a highest set water level HWL, all of the pumps 3 are stopped. On the other hand, when the water level is the following, the number of pumps 3 operated is controlled as follows:

When the water level is higher than a first controlled water level LT1, the number of pumps 3 is determined to one by the following formula:

$$LT1=((HWL-LWL)/5) \times 1-HWL$$

where LWL is a lowest set water level.

When the water level is higher than a second controlled water level LT2, the number of pumps 3 is determined to two by the following formula:

$$LT2=((HWL-LWL)/5) \times 2-HWL$$

When the water level is higher than a three controlled water level LT3, the number of pumps 3 is determined to third by the following formula:

$$LT3=((HWL-LWL)/5) \times 3-HWL$$

When the water level is higher than a fourth controlled water level LT4, the number of pumps 3 is determined to four by the following formula:

$$LT4=((HWL-LWL)/5) \times 4-HWL$$

When the water level is higher than a fifth controlled water level LT5, the number of pumps 3 is determined to five by the following formula:

$$LT4=((HWL-LWL)/5) \times 5-HWL$$

FIG. 22 shows a water distributing installation wherein known distributing-reservoir water-level control is applied to valve-opening control. Referring to FIG. 22, a distributing reservoir 1 is provided with a level gauge 2 for measuring the level of water therein. There is arranged a water valve 6 controlled in opening degree when supplying water from a clear-water reservoir to the distributing reservoir 1. The water valve 6 is controlled by a valve-opening change command derived from a water-valve control part 7. The water-valve control part 7 determines the opening degree of the water valve 6 by a signal derived from the level gauge 2. 8 designates a distribution pump.

With the water distributing installation having the above structure, when the water level of the distributing reservoir 1 is higher than the highest set water level HWL, the water valve 6 is closed, whereas when the water level is higher than LT1, the water valve 6 is put in the 50% opening degree. It is noted that LT1 is determined by the following formula:

$$LT1=((HWL-LWL)/5) \times 1-HWL$$

Likewise, when the water level is higher than LT2, the water valve 6 is put in the 55% opening degree. when the water level is higher than LT3, the water valve 6 is put in the 60% opening degree. When the water level is higher than LT4, the water valve 6 is put in the 65% opening degree. The corresponding formulae are as follows:

$$LT2=((HWL-LWL)/5) \times 2-HWL$$

$$LT3=((HWL-LWL)/5) \times 3-HWL$$

$$LT4=((HWL-LWL)/5) \times 4-HWL$$

On the other hand, when the water level is lower than LT4, the water valve 6 is put in the 70% opening degree.

FIG. 23 shows a water distributing installation wherein known distributing-reservoir water-level control is applied to pumps-number control for a chlorine mixing reservoir. Referring to FIG. 23, a distributing reservoir 1 is provided with a level gauge 2 for measuring the level of water therein. Water pumps 3 are arranged to supply water from a chlorine mixing reservoir 9 to the distributing reservoir 1. The water pumps 3 are controlled by a pump start/stop command derived from a pumps-number control part 4. The pumps-number control part 4 determines the number of pumps operated by a signal derived from the level gauge 2. 5 designates a duct network of a distributing area. As for pump start/stop, pump start is lagged 30 min. to correspond to flow-change time of a chlorine injection equipment 10, and pump stop is lagged 30 min. to correspond to flow-change time thereof.

The distributing reservoir of the water distributing installation needs to provide the cushioning function of water delivery and time variations. The simplest control of the water level of the distributing reservoir is control at the constant water level which is, however, practically ineffective in cushioning function. Though control at a target water level set every hour which considers time variations in water distribution obtains a certain result, it frequently produces a day where a result is unsatisfactory due to the fact that the distribution pattern is not constant every day. In view of an accident which occurs upstream of the distributing reservoir, the distributing reservoir needs to provide a water storage/ distribution capacity. In order to fully meet this requirement, the water level of the distributing reservoir is always determined to a higher value within the range of effective depth. However, the water level needs to vary to some degree to meet the requirement of the cushioning function, and it needs to keep a higher constant value to meet the requirement upon occurrence of an accident.

Control is required which can satisfactorily adjust those requirements conflicting with each other. However, such ideal control is not achieved yet.

Moreover, with the above controls, increased number of times of pump start/stop causes damage to the installation and devices, resulting in lowered durability thereof.

It is, therefore, an object of the present invention to provide water distributing installation controllers which allow efficient control of water distribution and improved durability of the devices.

SUMMARY OF THE INVENTION

There is provided, according to the present invention, a system for controlling a water distributing installation with a filtration plant and a reservoir for distributing water to an area, the system comprising:

means for allowing a water supply from the filtration plant to the reservoir;

a level gauge arranged in the reservoir to measure a water level thereof;

a first flowmeter arranged between the reservoir and said allowing means to measure a water supply directed thereto;

a second flowmeter arranged between the reservoir and the area to measure a water delivery directed thereto;

means, connected to said level gauge, said first flowmeter, and said second flowmeter, for controlling said allowing means; and means, connected to said second flowmeter, for providing short-term demand prediction data on said water delivery to said controlling means at a request thereof.

DETAILED DESCRIPTION OF THE INVENTION

Figure 1:
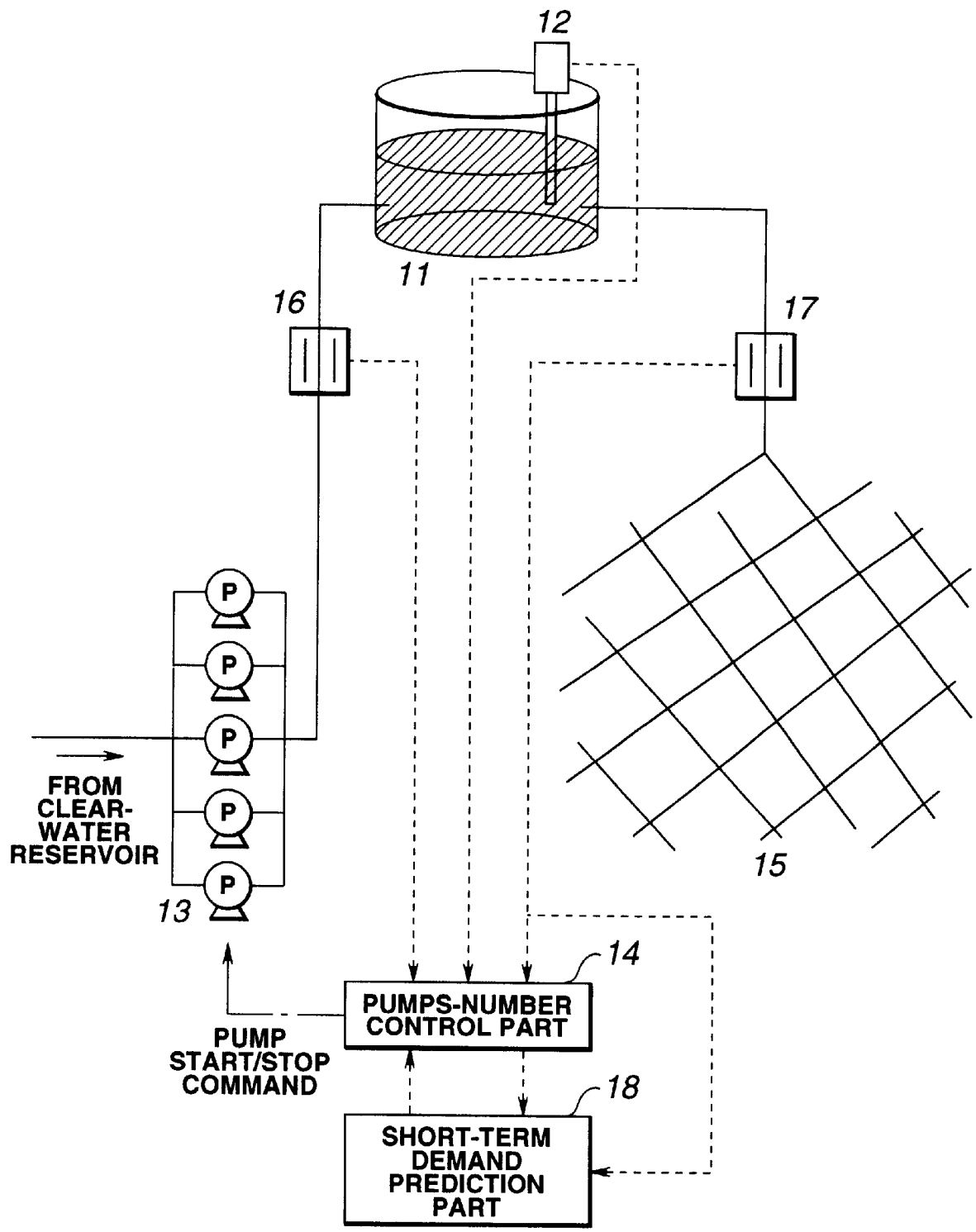
FIG. 1 is a block diagram showing a first embodiment of a water distributing installation controller according to the present invention.

Referring to the drawings wherein like reference numerals designate like parts throughout the views, a description will be made with regard to preferred embodiments of a water distributing installation controller according to the present invention.

FIGS. 1–4 and 6 show a first embodiment of the present invention. FIG. 1 shows a water distributing installation wherein a water distributing installation controller is applied to a pumps-number control. Referring to FIG. 1, a distributing reservoir 11 is provided with a level gauge 12 for measuring the level of water therein. Water pumps 13 are arranged to supply clear water temporarily accumulated in a clear-water reservoir, not shown, to the distributing reservoir 11. The level gauge 12 converts the water level of the distributing reservoir 11 into an electric signal which is provided to a pumps-number control part 14. The distributing reservoir 11 distributes clear water by natural fall to a duct network 15 of a distributing area in accordance with a demand thereof.

The pumps-number control part 14 receives, in addition to an electric signal derived from the level gauge 12, an electric signal derived from a first flowmeter 16 for measuring the water supply of the water pumps 13, and an electric signal derived from a second flowmeter 17 for measuring the water delivery of the distributing reservoir 11. The pumps-number control part 14 determines start/stop of the water pumps 13 in accordance with those electric signals, i.e. the water level of the distributing reservoir 11, the water supply, the water delivery, and short-term demand prediction data as will be described later so as to provide a pump start/stop command for controlling the water pumps 13.

A short-term demand prediction part 18 receives an electric signal indicative of the water delivery derived from the second flowmeter 17, and provides short-term demand prediction data to the pumps-number control part 14 at the request thereof. The short-term demand prediction part 18 will be described which adopts a method of short-term demand prediction based on the chaos theory. The short-term demand prediction part 18 accumulates in the time-series way the water delivery as integrated data per unit time, and embeds past time-series data on the water delivery in a state space of n dimensions and t hours lagged.

Figure 2C:
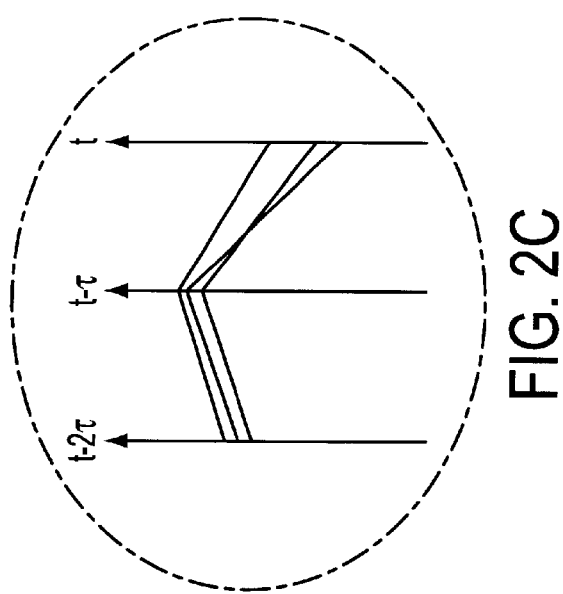
FIGS. 2A–2C are diagrammatic drawings showing embedding of time-series water-delivery data in a n-dimensional reconstructed state space.
Figure 2A:
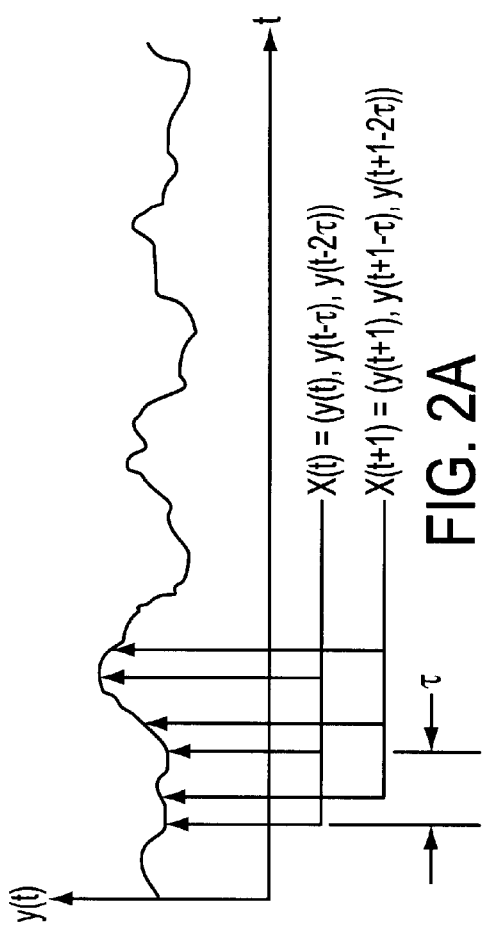
Figure 2B:
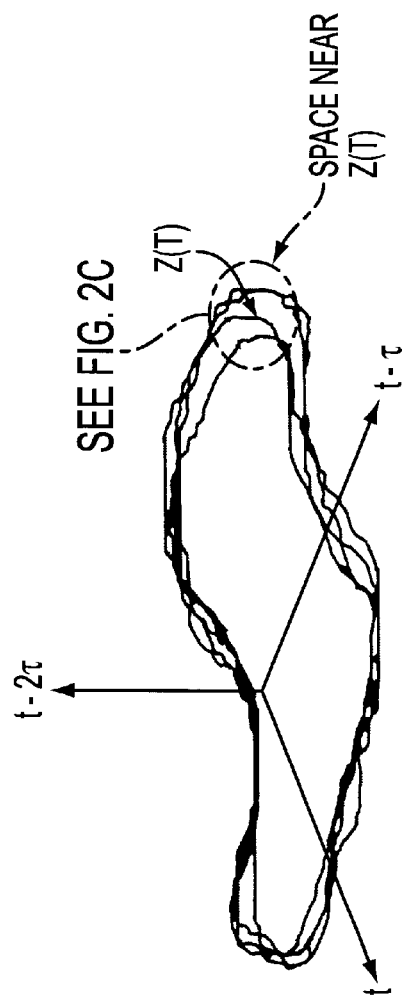
Figure 3:
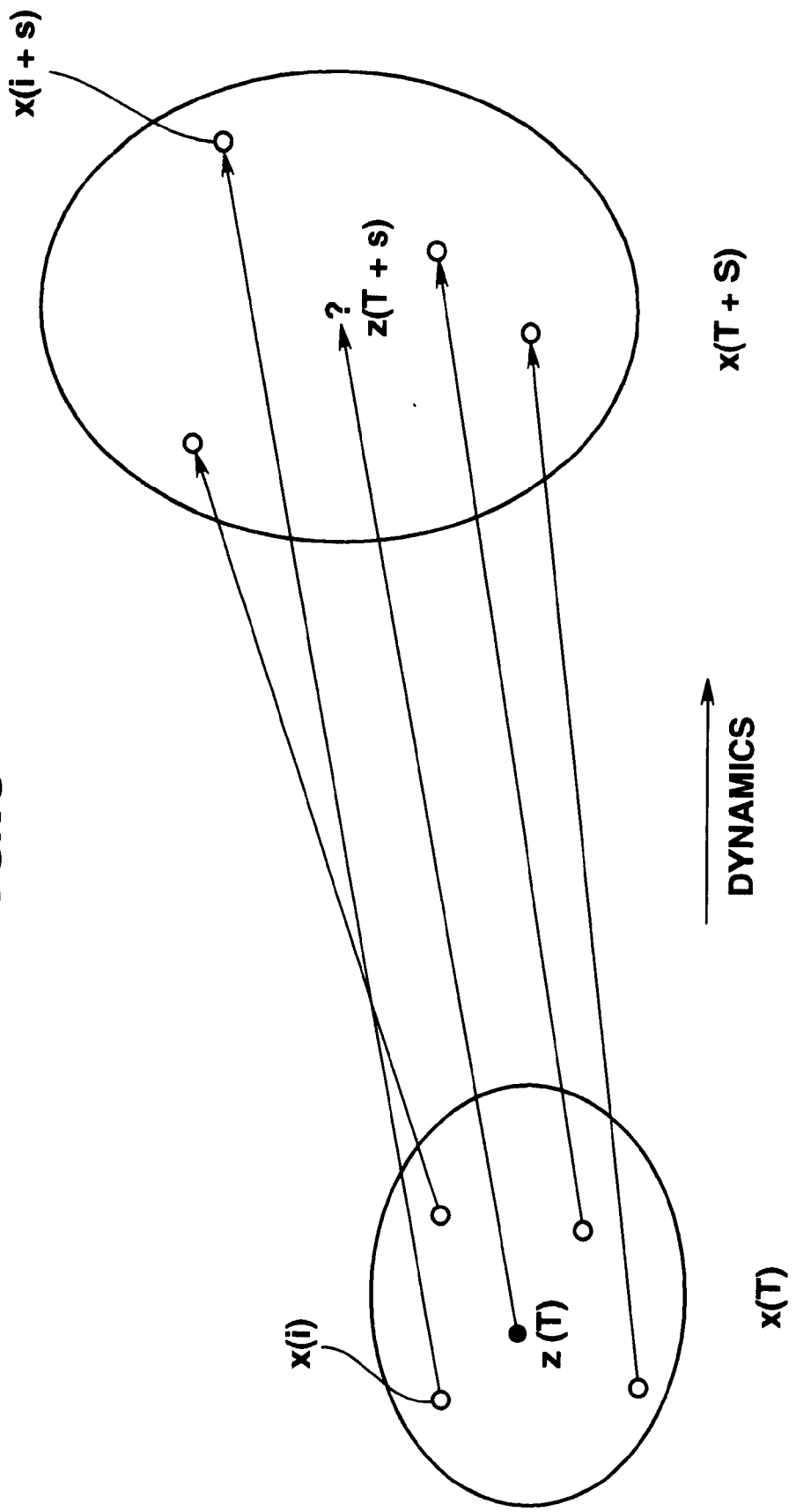
FIG. 3 is a view similar to FIGS. 2B–2C, showing dynamics from a data vector x(T) to a data vector x(T+s)

First, a vector $(y(t), y(t-\tau), y(t-2\tau), \ldots y(t-(n-1)\tau))$ where $\tau$ is a lag time is made from time-series data on the water delivery. The vector represents one point in a n-dimensional reconstructed state space $[R^n]$. Thus, when the time t is changed, the vector describes a path in the n-dimensional reconstructed state space as shown in FIGS. 2A–2C. Referring to FIGS. 2A–2C, and 3 a data vector $z(T)$ obtained by the latest observation is plotted in the n-dimensional reconstructed state space. Suppose that a data vector near the data vector $z(T)$ is $x(i)$, and that the state of the data vector $x(i)$ after s steps is $x(i+s)$. Moreover, suppose that a predicted value of a data vector $z(T+s)$ after the s steps is $\wedge z(T+s)$. It is noted that a predicted value accompanies $\wedge$ hereafter. A change of the state $x(i)$ to the state $x(i+s)$ after the s steps can be represented in language expression by using $x(i)$ and $x(i+s)$:

$$\text{IF } x(T) \text{ is } x(i) \text{ THEN } x(T+s) \text{ is } x(i+s) \quad (1)$$

In the formula (1), $x(T)$ is a set which represents the data vector near the data vector $z(T)$ in the n-dimensional reconstructed state space, and $x(i)$ is a set which represents therein the data vector $x(T)$ after the s steps, so that the dynamics from the state $z(T)$ to the state $z(T+s)$ can be estimated based on the dynamics from the state $x(i)$ to the state $x(i+s)$.

An attractor embedded in the n-dimensional reconstructed state space is a smooth manifold, and a path from $z(T)$ to $z(T+s)$ is influenced by an Euclidean distance between $z(T)$ and $x(i)$. Moreover, the following formulae are given:

$$x(i)=(y(i), y(i-\tau), y(i-2\tau), \ldots y(i-(n-1)\tau)) \; x(i+s)=(y(i+s), y(i+s-\tau), y(i+s-2\tau), \ldots y(i+s-(n-1)\tau)) \quad (2)$$

When noting a j axis in the n-dimensional reconstructed state space, the formula (2) can be represented:

$$\text{IF } aj(T) \text{ is } yj(i) \text{ THEN } aj(T+s) \text{ is } yj(i+s) \quad (3)$$

(j=1 to n)

where $aj(T)$ is a j-axis component of a neighbor value $x(i)$ of $z(T)$ in the n-dimensional reconstructed state space, and $aj(T+s)$ is a j-axis component of a neighbor value $x(i+s)$ of $z(T)$ therein, and n is an embedding-dimension number.

A path from $Z(T)$ to $\wedge z(T+s)$ is influenced by a vector distance from $z(T)$ to $x(i)$ nonlinearly due to that fact that the embedded attractor is a smooth manifold. Thus, when the formula (3) is represented by a fuzzy function to make the mapping from $x(T)$ to $x(T+s)$ nonlinear, the following formula is given:

$$\text{IF } aj(T) \text{ is } \tilde{y}j(i) \text{ THEN } aj(T+s) \text{ is } \hat{y}j(i+s) \quad (4)$$

(j=1 to n)

where $\tilde{y}j(i)$ is a fuzzy value of $yj(i)$, and $\hat{y}j(i)$ is a predicted value of $yj(i)$.

Since $z(T)=(y(T), y(T-\tau), y(T-2\tau), \ldots y(T-(n-1)\tau))$, a j-axis component of $z(T)$ in the n-dimensional reconstructed state space is $yj(T)$. Thus, a j-axis component of a predicted value $[\wedge z(T+s)]$ of the data vector $z(T+s)$ indicative of the data vector $z(T)$ after the s steps, which can be obtained by the fuzzy inference by substituting a fuzzy value $[\tilde{y}j(T)]$ into $aj(T)$ in the formula (4), is $aj(T+s)$.

The short-term demand prediction part 18 provides prediction data on the demand of the distributing area obtained in the above way to the pumps-number control part 14 at the request thereof. The pumps-number control part 14 comprises a predicted water-level calculation part and a pump start/stop control part. First, the operation of the predicted water-level calculation part will be described. The predicted water-level calculation part calculates a predicted water level L1 after one unit time adopted in the short-term demand prediction part 18 based on the following formula:

$$L1=(Q0-Q1)/S+L0$$

Then, a predicted water level L2 after two unit times is as follows:

$$L2=(Q0-Q2)/S+L1$$

Likewise, predicted water levels L3, L4, L5 ... L12 after three, four, five ... twelve unit times are as follows:

$$L3=(Q0-Q3)/S+L2$$

$$L4=(Q0-Q4)/S+L3$$

$$L5=(Q0-Q5)/S+L4$$

$$L12=(Q0-Q12)/S+L11$$

where S is a bottom area of the distributing reservoir 11, L0 is a current water level, Q0 is a water supply (integration of current values) of the water pumps 13 (per unit time), Q1 is a predicted water delivery during a first unit time (per unit time), Q2 is a predicted water delivery during a second unit time (per unit time), and so forth.

Next, the operation of the pump start/stop control part will be described. The pump start/stop control part carries out control of decreasing one water pump 13 when the predicted water level is higher than a highest set water level or pumps-number decreasing water level HWL within the range of a preset prediction effective number ET used for pumps-number control, and control of increasing one water pump 13 when the predicted water level is lower than a lowest set water level or pumps-number increasing water level LWL within the range of the preset prediction effective number ET. The water pumps 13 are controlled by a pump start/stop command derived from the pumps-number control part 14 in the above way.

Figure 4A:
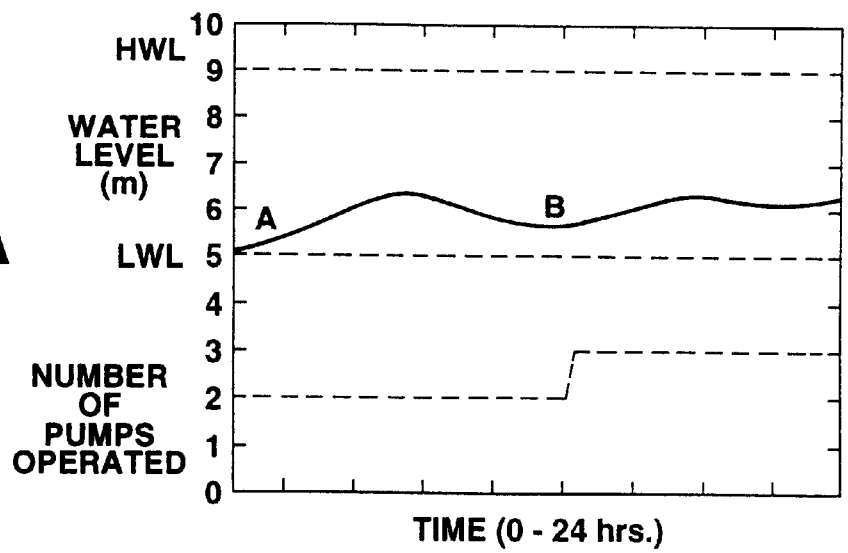
FIGS. 4A–4C are graphs showing the results of control of the first embodiment.
Figure 4B:
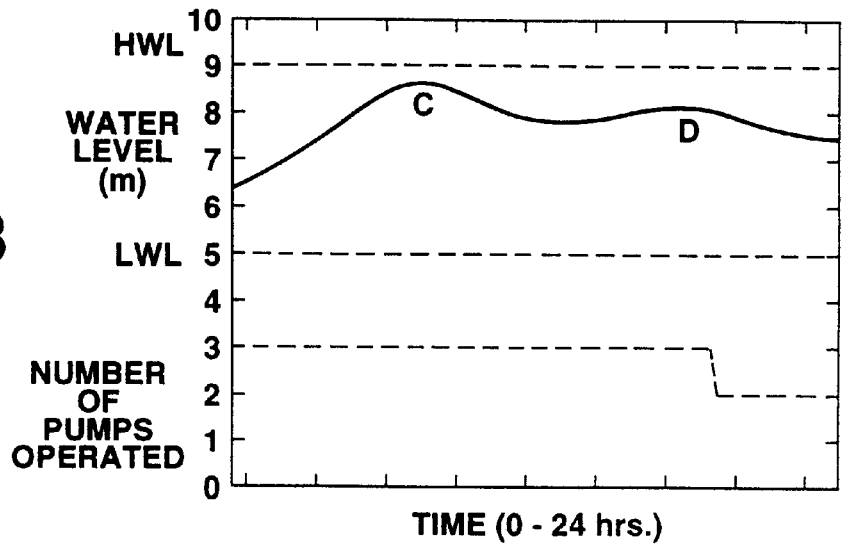
Figure 4C:
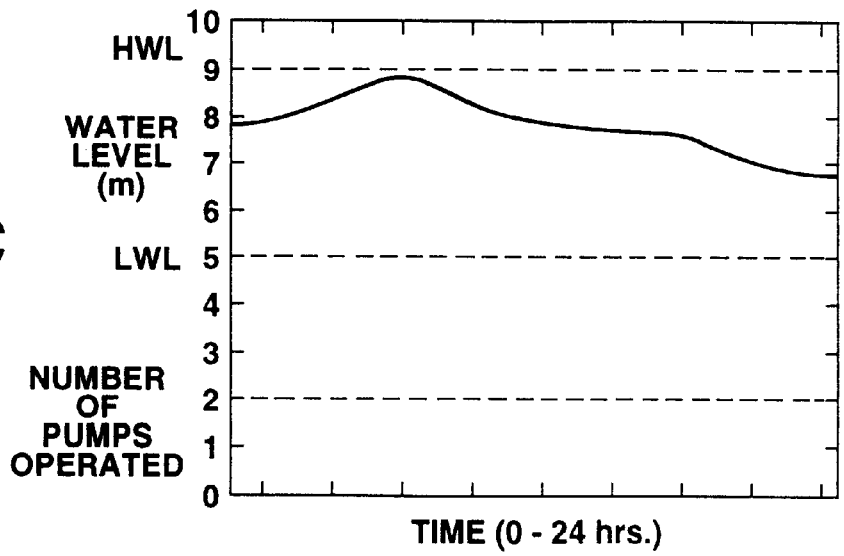
Figure 5:
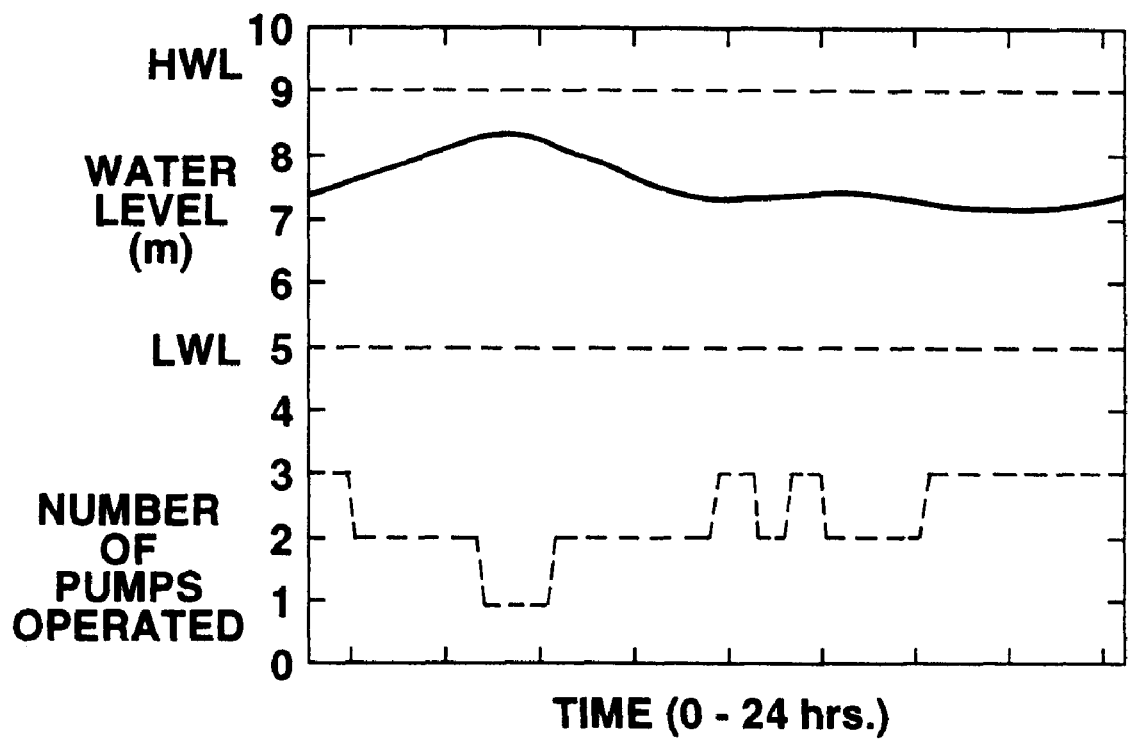
FIG. 5 is a view similar to FIGS. 4A–4C, showing the results of control of the prior art as shown in FIG. 21.
Figure 21:
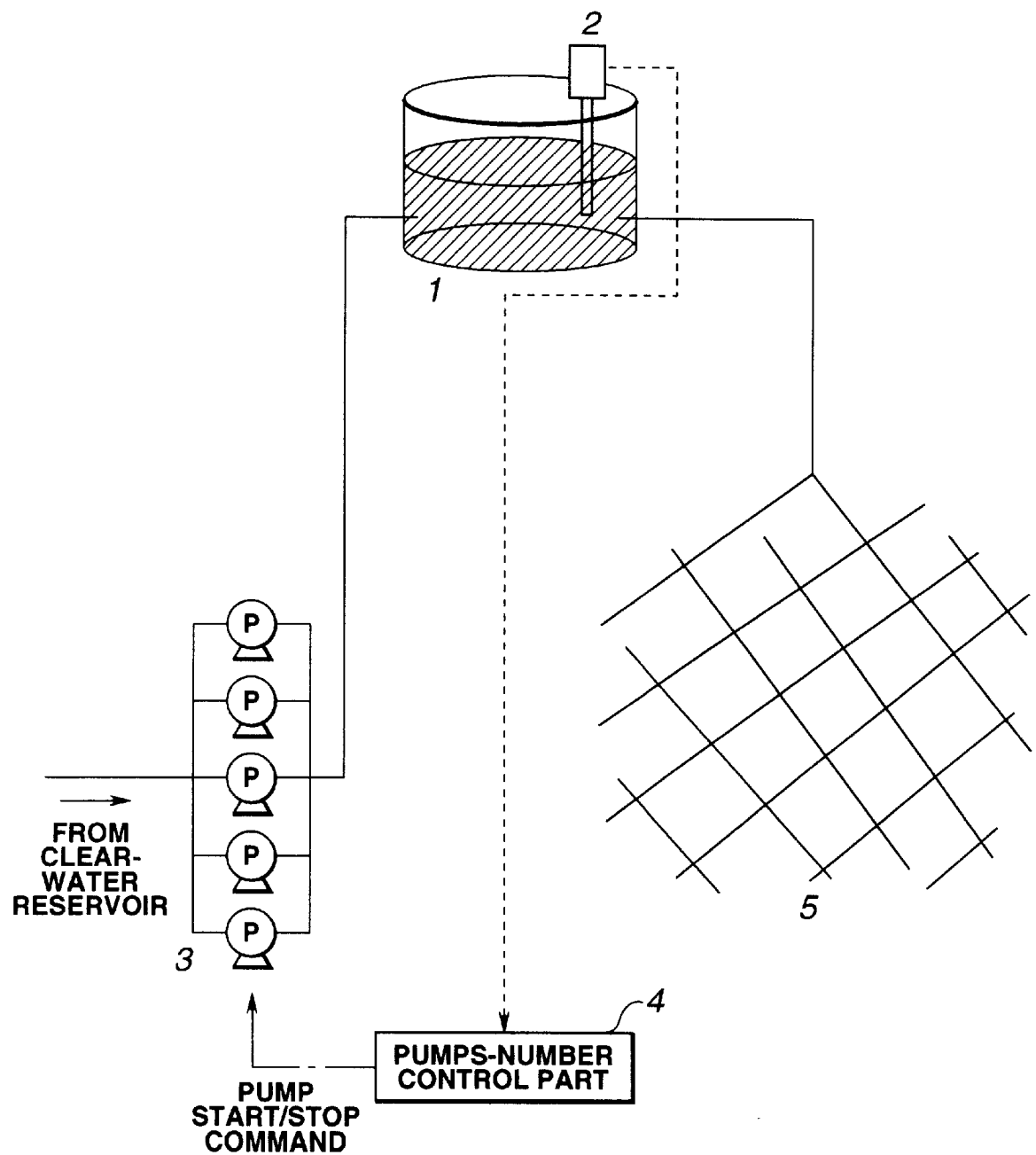
FIG. 21 is a view similar to FIG. 14, showing a known water distributing installation controller.
Figure 22:
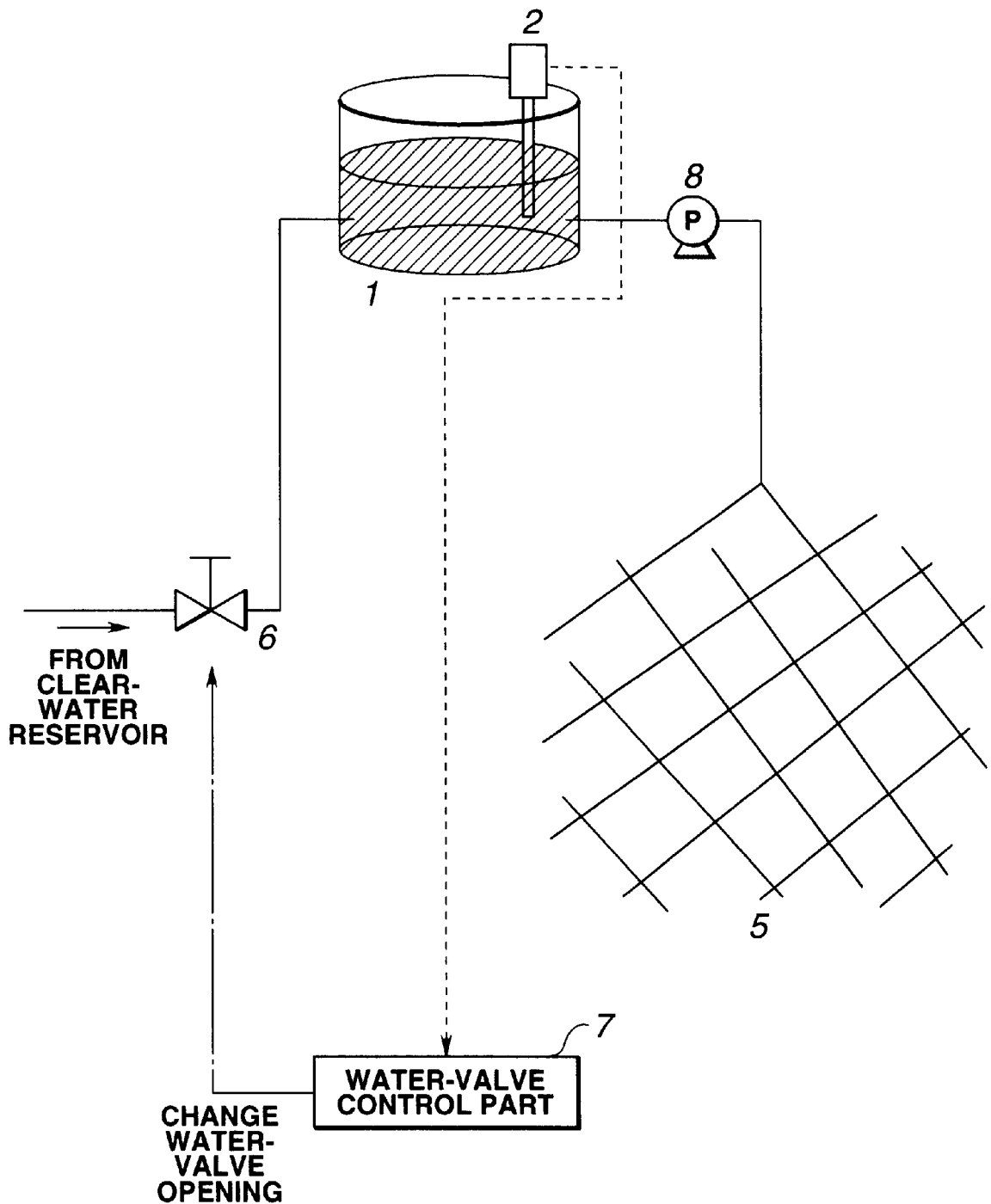
FIG. 22 is a view similar to FIG. 21, showing another known water distributing installation controller.
Figure 23:
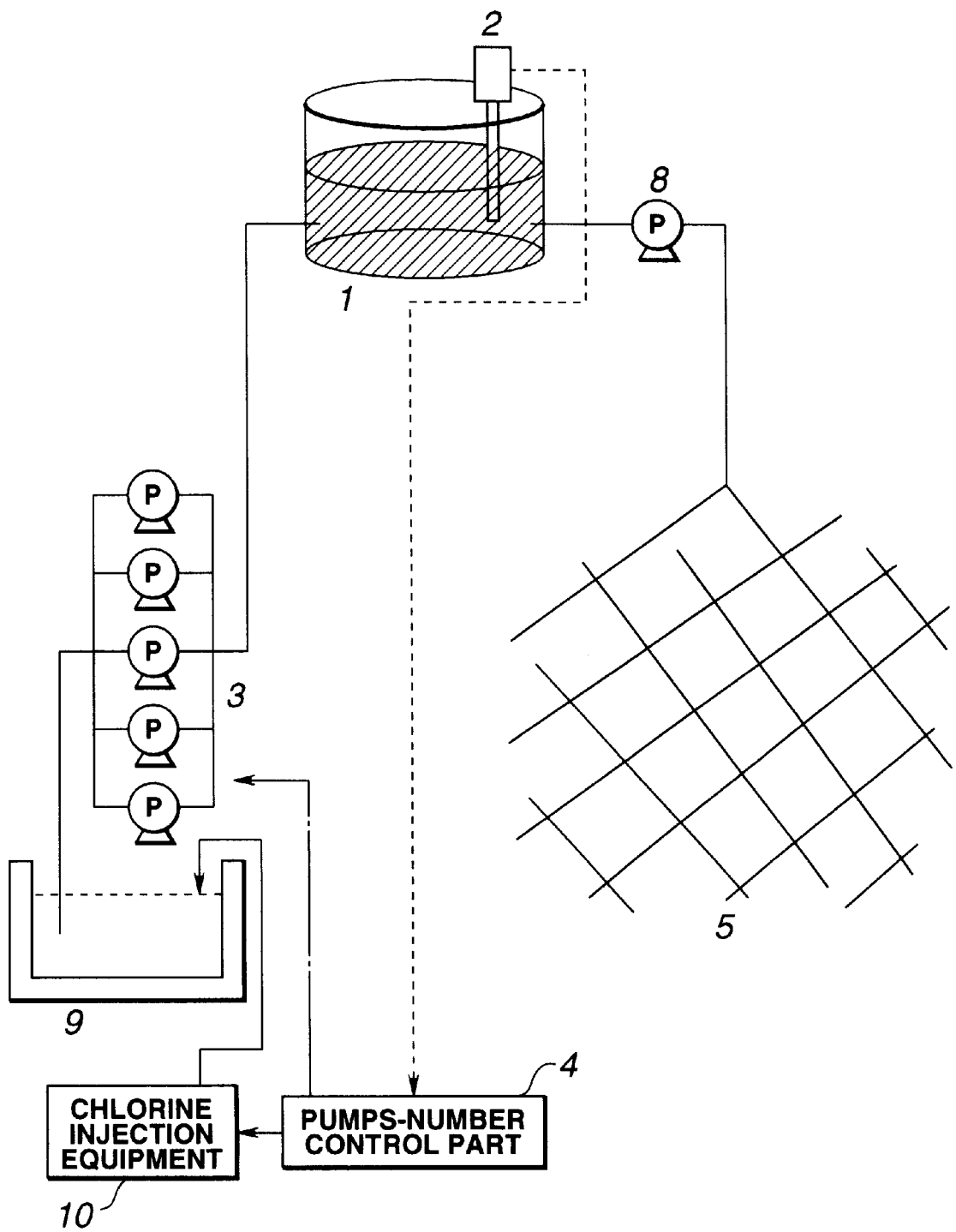
FIG. 23 is a view similar to FIG. 22, showing further known water distributing installation controller.

Referring to FIGS. 4A–5, the results of control of the first embodiment and the prior art as shown in FIG. 21 will be compared with each other. Referring to FIGS. 4A–4C, set values in the first embodiment are as follows. The highest set water level HWL is 9 m, the lowest set water level LWL is 5 m, a unit time is 1 hr., a predicted effective number ET is 8, the control period is 1 hr., and the effective depth of the distributing reservoir 11 is 10 m. For prediction of the water delivery, the water delivery per hour during 1.5 month before start of control is input to the short-term demand prediction part 18.

FIG. 4A shows data on a day having start of the water pumps 13, indicating that the third pump 13 is started at a point B. It is understood from FIG. 4A that pump start does not occur at a point A since no problem arises with a predicted water level though the water level at which is lower than that at the point B, and that it occurs at the point B since a future water level is predicted to be lower.

FIG. 4B shows data on a day having stop of the water pumps 13, indicating that the third pump 13 is stopped at a point D. It is understood from FIG. 4B that pump stop does not occur at a point C since no problem arises with a predicted water level though the water level at which is higher than that at the point D, and that it occurs at the point D since a future water level is predicted to be higher.

FIG. 4C shows data on a day having no start/stop of the water pumps 13, indicating that the water level varies gently in accordance with variations in the water delivery.

FIG. 5 shows data on a typical day in the prior art, indicating that the water level varies in accordance with variations in the water delivery, and pump start/stop occurs whenever the water level exceeds set values such as LT1 to keep it within the control range, resulting in the increasing number of times thereof. It is noted that set values in the prior art are the same as those in the first embodiment.

The first embodiment studies data on 14 successive days. The number of times of pump start is 5, and the water level varies gently between HWL and LWL, and does not exceed HWL, nor LWL. Likewise, the prior art studies data on 14 successive days in a period with the total water delivery similar to that of the first embodiment. The number of times of pump start is 52, and the water level does not exceed HWL, nor LWL. The number of pumps operated is 2–3 in the first embodiment, whereas it is 1–3 in the prior art.

Figure 6:
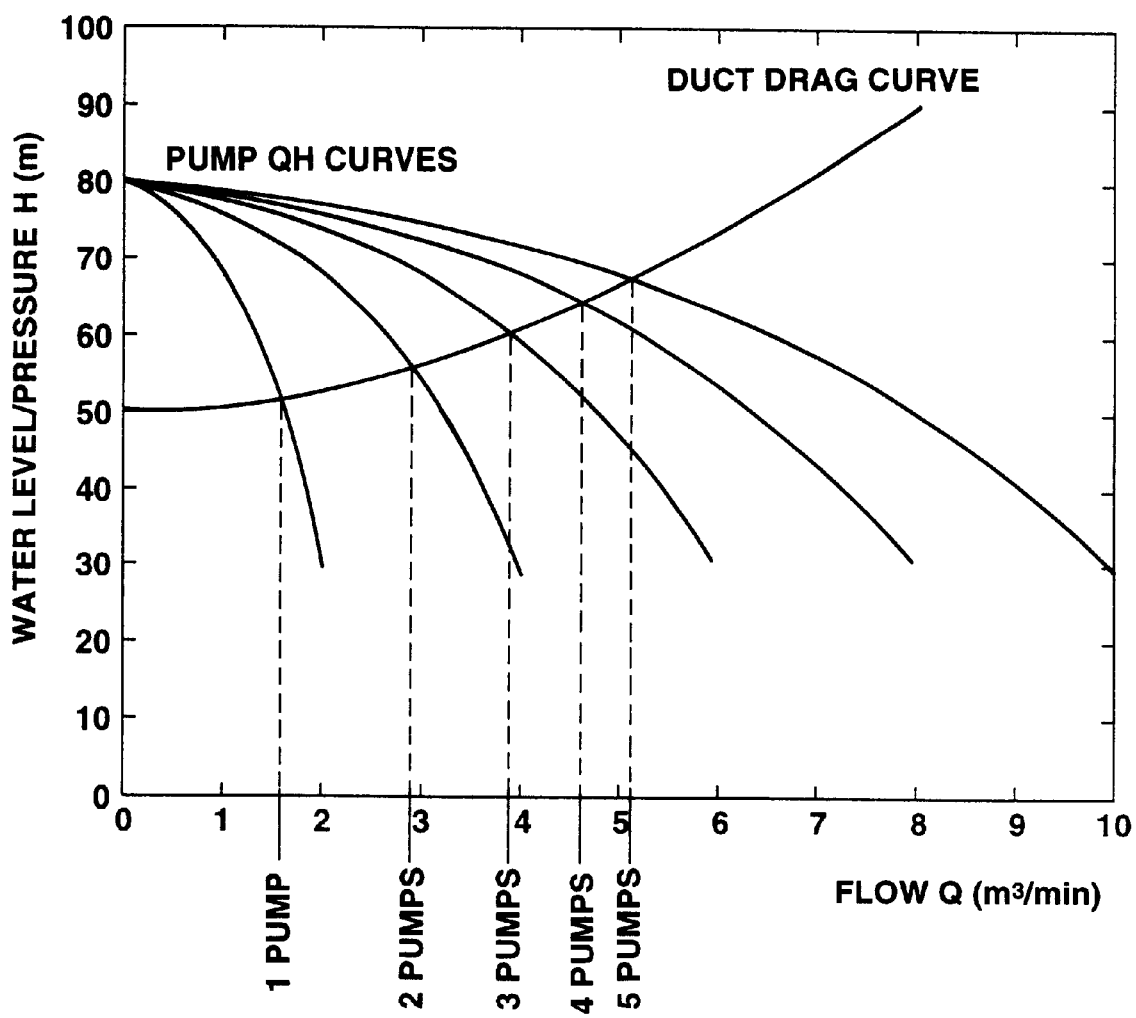
FIG. 6 is a view similar to FIG. 5, showing flow vs. water level/pressure curves for five pumps studied in the first embodiment and the prior art.

FIG. 6 shows flow vs. water level/pressure curves for five pumps studied in the first embodiment and the prior art. The first embodiment adopts the general configuration including the water pumps 13 in parallel operation and a common water duct, wherein in view of the duct drag, the water supply acceleratedly reaches the ceiling as the number of pumps 13 operated is increased. That is, the efficiency of each water pump 13 is lowered with the water supply reducing acceleratedly. Therefore, in view of energy saving, the pump operation is carried out, preferably, with less change of the number of pumps 13 operated, and slow alternation thereof which ensures two values of flow between which the average water delivery is positioned. Such pump operation corresponds to that of the first embodiment wherein the operation of two pumps 13 and that of three pumps 13 are slowly repeatedly carried out.

In the first embodiment, the water distributing installation receives clear water from a filtration plant, and distributes it to a distributing area. In view of the structure, the filtration plant ensures, preferably, stable supply of a substantially given quantity of clear water, so that the state of the first embodiment wherein the operation of two pumps 13 and that of three pumps 13 are slowly repeatedly carried out produces a greater effect in terms of stable running of the filtration plant.

Next, the effect of the first embodiment will be described. According to the first embodiment, the number of times of pump start is only 5 during 14 days, which means excellent control in view of not only durability of the water pumps 13 and the associated devices, but energy saving in terms of a greater quantity of electricity upon pump start. Moreover, the number of pumps 13 operated is only 2–3, resulting in pump operation with the highest efficiency and stable water receiving from the filtration plant, i.e. excellent running of the water distributing installation.

Figure 7:
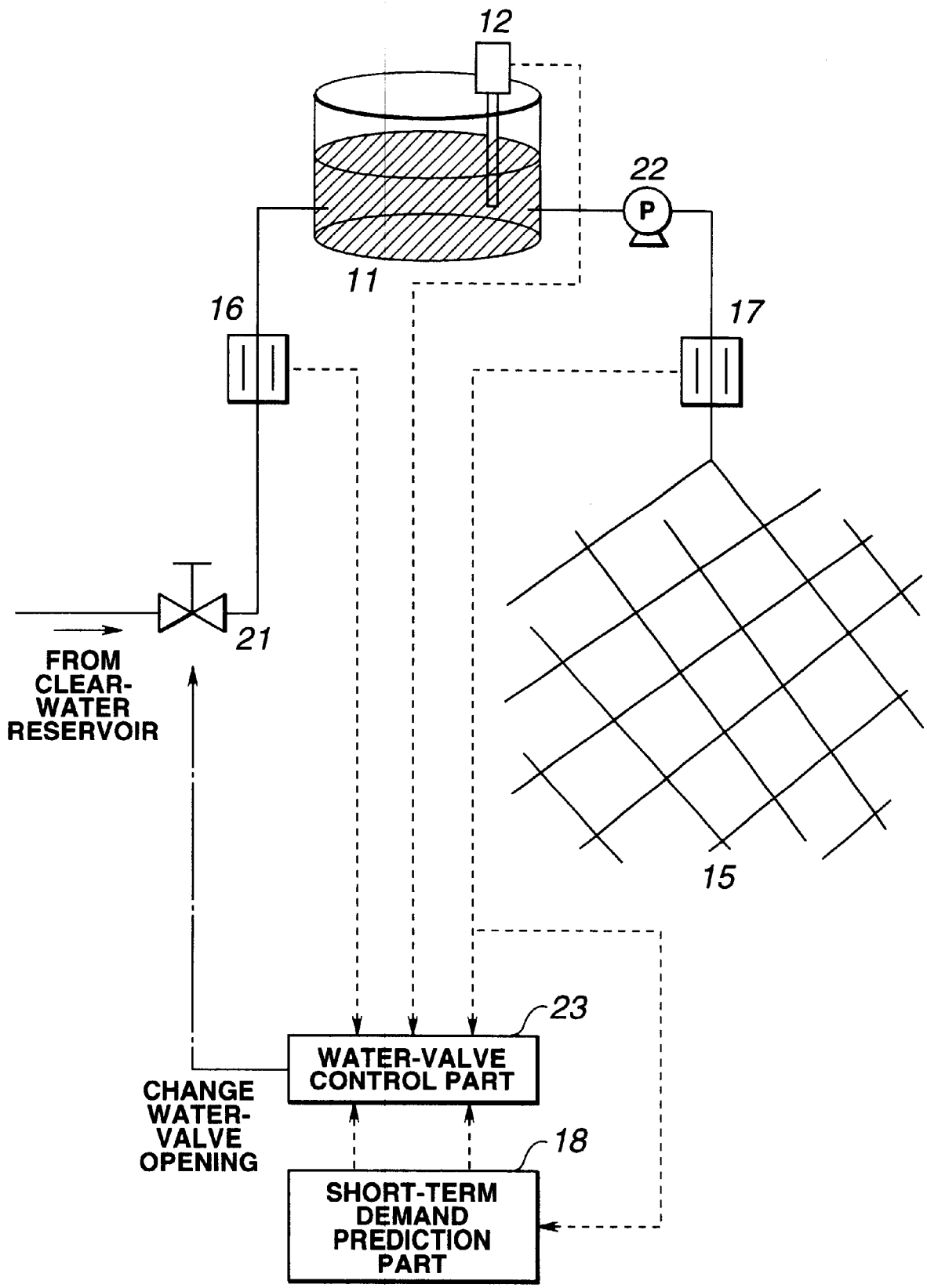
FIG. 7 is a view similar to FIG. 1, showing a second embodiment of the present invention.
Figure 8A:
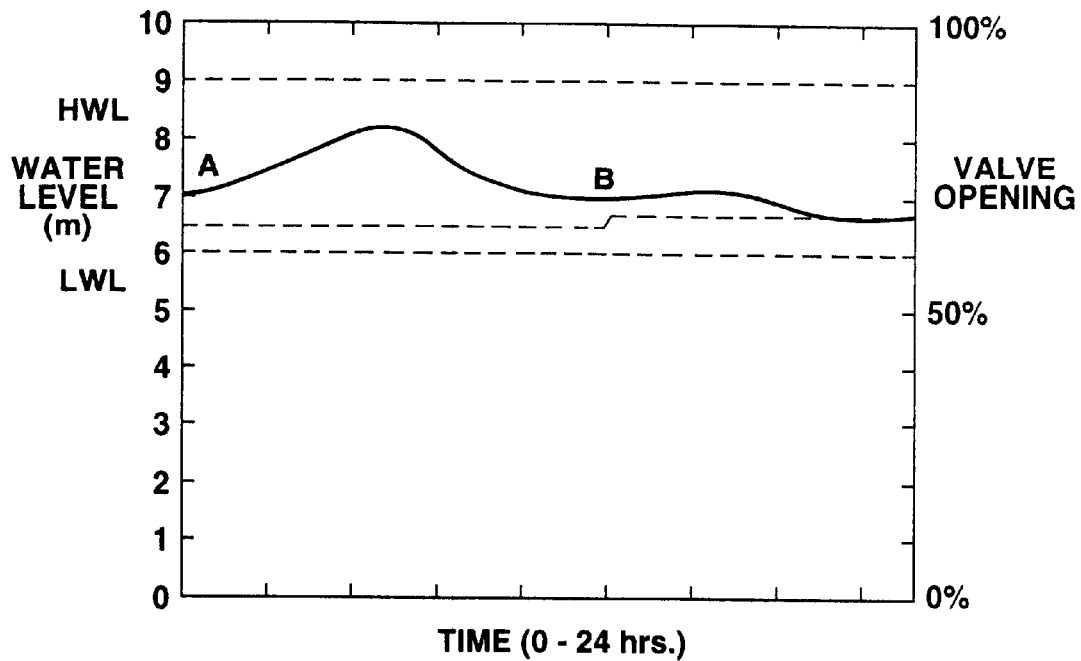
FIGS. 8A–8B are views similar to FIG. 6, showing the results of control of the second embodiment.
Figure 8B:
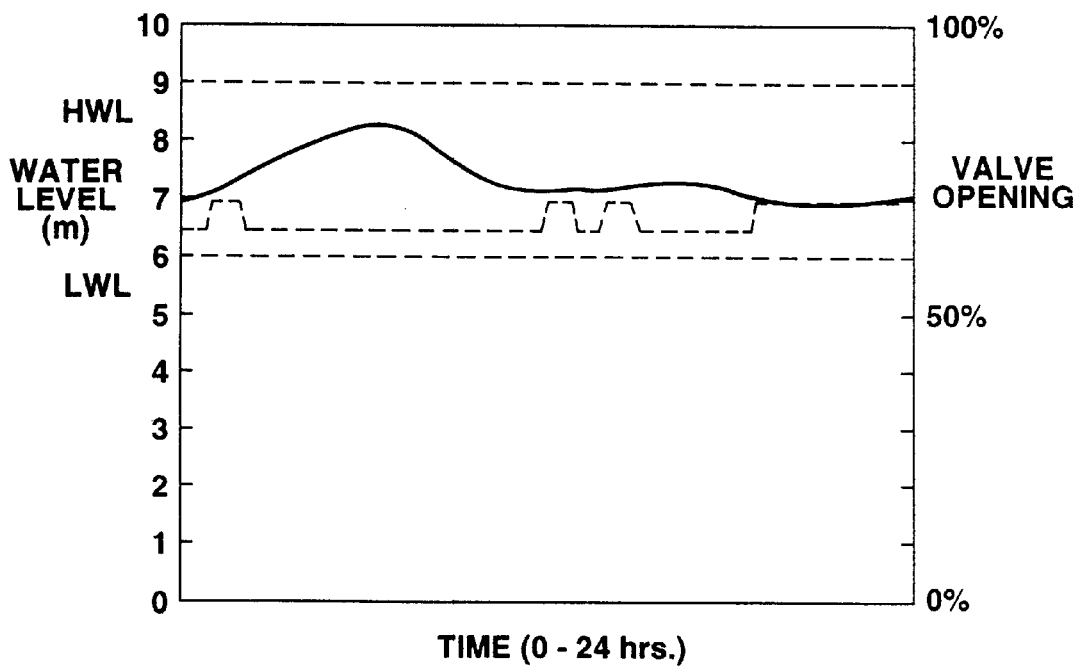

FIGS. 7–8B show a second embodiment of the present invention. FIG. 7 shows a water distributing installation wherein the water distributing installation controller is applied to a valve-opening control. Generally, clear water produced in a filtration plant is supplied to a distributing reservoir in a distributing area by natural fall or by water pumps. The distributing reservoir can receive clear water in accordance with the required quantity by controlling a water valve. However, since the filtration plant produces clear water only in the constant way, the distribution reservoir often should be operated to receive clear water with closer to constant flow in view of the characteristic of the whole system. In the second embodiment, the flow of clear water from the filtration plant is controlled by a water valve 21. The distributing reservoir 11 distributes through a distribution pump 22 clear water to a duct network 15 in the distributing area in accordance with a demand thereof.

The water level of the distributing reservoir 11 is measured by a level gauge 12, which is provided to a water-valve control part 23. The quantity of water received through the water valve 21 is measured by a first flowmeter 16, which is provided to the water-valve control part 23. Moreover, the water delivery of the distributing reservoir 11 is measured by a second flowmeter 17, which is provided to the water-valve control part 23. A short-term demand prediction part 18 receives an electric signal indicative of the water delivery derived from the second flowmeter 17, and provides short-term demand prediction data to the water-valve control part 23 at the request thereof. The water-valve control part 23 determines the opening degree of the water valve 21 based on the water level, the water delivery, and the short-term demand prediction data so as to provide a valve opening/closing command for controlling the valve opening degree.

The short-term demand prediction part 18 adopts a barycentric method which is a simplified local fuzzy reconstruction method. As for the local fuzzy reconstruction method, see U.S. Patent Application of Tadashi IOKIBE, Ser. No. 08/395,980. The barycentric method takes the same steps as those of the local fuzzy reconstruction method up to embedding of data z(T) in the n-dimensional reconstructed state space and extract of data near z(T). For prediction, the barycenter of a value of the data near z(T) is obtained with regard to a j-axis component of z(T) to serve as a predicted value. The short-term demand prediction part 18 provides prediction data on the demand of the distributing area obtained in the above way to the water-valve control part 23 at the request thereof.

The water-valve control part 23 comprises a predicted water-level calculation part as described in the first embodiment and a valve control part. The operation of the valve control part will be described. The valve control part carries out control of closing the water valve 21 by a predetermined amount when the predicted water level is higher than a highest set water level HWL upon valve gradually closing operation within the range of a preset prediction effective number ET, and control of opening the water valve 21 by a predetermined amount when the predicted water level is lower than a lowest set water level LWL upon valve gradually opening operation within the range of the preset prediction effective number ET. The water valve 21 is controlled by a valve control command derived from the valve control part 21 in the above way.

Referring to FIGS. 8A–8B, the results of valve-opening control of the second embodiment and that of the prior art will be compared with each other. Referring to FIGS. 8A–8B, set values in the second embodiment are as follows. The highest set water level HWL is 9 m, the lowest set water level LWL is 6 m, a unit time is 1 hr., a predicted effective number ET is 8, the control period is 1 hr., and the effective depth of the distributing reservoir 11 is 10 m. For prediction of the water delivery, the water delivery per hour during 1.5 month before start of control is input to the short-term demand prediction part 18.

FIG. 8A shows data on a day having control of the water valve 21, indicating that the water valve 21 is opened at a point B. It is understood from FIG. 8A that the valve opening degree is not changed at a point A since no problem arises with a predicted water level though the water level at which is substantially equal to that at the point B, and that it is gradually increased at the point B since a future water level is predicted to be lower. On the other hand, with the prior art as shown in FIG. 8B, the water level varies in accordance with variations in the water delivery, and the valve gradually opening/closing operation occurs whenever the water level exceeds set values such as LT1. Control of the prior art can keep the water level within the control range, but has a drawback that the number of times of valve adjustment is increased.

The second embodiment studies data on 14 successive days. The number of times of the valve operation is 3. The reason for less number of times of the valve operation in the second embodiment is that the valve opening degree corresponds by itself to a value at which variations in the water level optimize the width of controlled water level, and is hardly changed once stabilized. The water level varies gently between HWL and LWL, and does not exceed HWL, nor LWL. Likewise, the prior art studies data on 14 successive days in a period with the total water delivery similar to that of the second embodiment. The number of times of the valve operation is 55, and the water level does not exceed HWL, nor LWL.

Next, the effect of the second embodiment will be described. According to the second embodiment, even with control of the distributing reservoir 11 which receives clear water through the water valve 21, control adopting short-term demand prediction enables a reduction in the number of times of the valve operation Further, with control of the distributing reservoir 11 which receives clear water through the water valve 21, the valve opening degree corresponds by itself to a value at which the number of times of the valve operation minimizes with a lapse of time, enabling more stable control. Furthermore, a reduction in the number of times of the valve operation enables stable receiving of clear water from the filtration plant, contributing to stable running of the filtration plant, and supply of clear water of lower cost due to possible reduction in size of water tanks. Still further, less number of times of the valve operation is effective for prevention of the water hammer action when supplying clear water through long ducts, etc. Finally, the study reveals that the barycentric method for the chaos short-term demand prediction can achieve rather excellent results of control.

Figure 9:
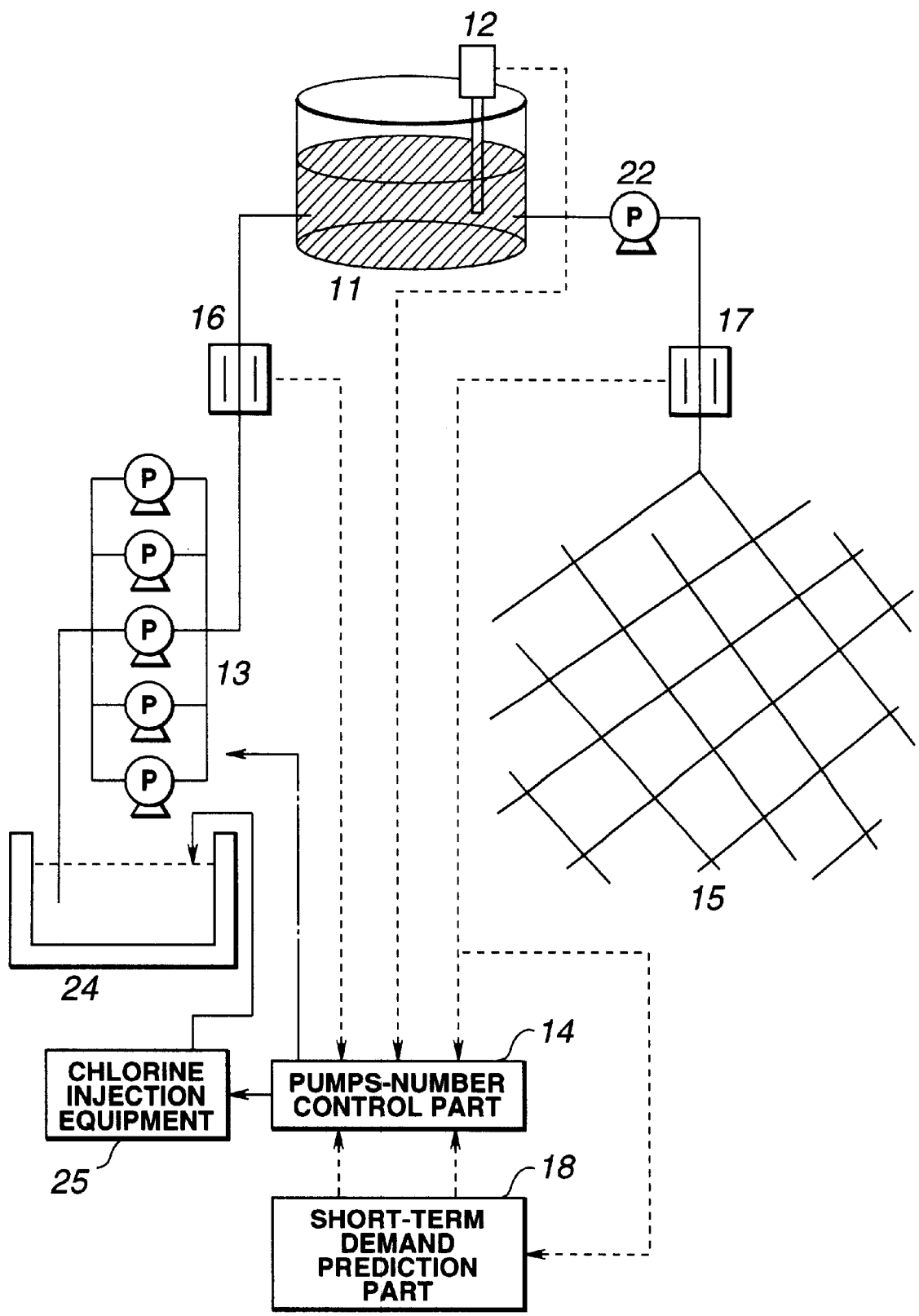
FIG. 9 is a view similar to FIG. 7, showing a third embodiment of the present invention.

FIGS. 9–13 show a third embodiment of the present invention. FIG. 9 shows a water distributing installation wherein the water distributing installation controller is applied to the pumps-number control for a chlorine mixing reservoir. Referring to FIG. 9, water pumps 13 are arranged to supply clear water temporarily accumulated in a clear-water reservoir, not shown, to a distributing reservoir 11. The distributing reservoir 11 distributes clear water by a distribution pump 22 to a duct network 15 of a distributing area in accordance with a demand thereof. The water level of the distributing reservoir 11 is measured by a level gauge 12, which is provided to a pumps-number control part 14. The water supply of the water pumps 13 is measured by a first flowmeter 16, which is provided to the pumps-number control part 14. Moreover, the water delivery of the distributing reservoir 11 is measured by a second flowmeter 17, which is also provided to the pumps-number control part 14.

The water delivery measured by the second flowmeter 17 is also provided to a short-term demand prediction part 18 which outputs short-term demand prediction data to the pumps-number control part 14 at the request thereof. The pumps-number control part 14 determines start/stop of the water pumps 13 in accordance with the water level, the water supply, the water delivery, and the short-term demand prediction data so as to provide a pump start/stop command for controlling the water pumps 13. In view of the fact that upon start of the water pumps 13, a chlorine injection equipment 25 needs time for changing the injection quantity, pump start is carried out 30 min. after pump start determination. Likewise, pump stop is carried out 30 min. after pump stop determination.

The short-term demand prediction part 18 ensures short-term demand prediction as follows. First, past water-delivery patterns are classified into three day types:

Type 1: Monday–Friday

Type 2: Saturday

Type 3: Sunday and national holiday (which is prior to Sunday)

For short-term demand prediction of a day, three closest days are selected from the past days of the same type in accordance with the type of the day so as to extract from water distribution data of those days data on a prediction time, the average of which is determined to obtain a predicted value. By way of example, when determining the water delivery on a Tuesday at 11, three closest days of Type 1, i.e. preceeding Monday, last Friday, and last Thursday, are studied to determine the average of the water deliveries of the three days (540 $m^3$ on Monday at 11, 600 $m^3$ on Friday at 11, and 510 $m^3$ on Tuesday at 11), obtaining a predicted value of 550 $m^3$.

Next, the pumps-number control part 14 will be described. This control part 14 ensures the same control as that of the pumps-number control part 14 as described in the first embodiment except that as for start/stop of the water pumps 13, pump start is lagged 30 min. to correspond to an injection-quantity change time of the chlorine injection equipment 25, and pump stop is lagged 30 min. to correspond to an injection-quantity change time thereof.

Figure 10A:
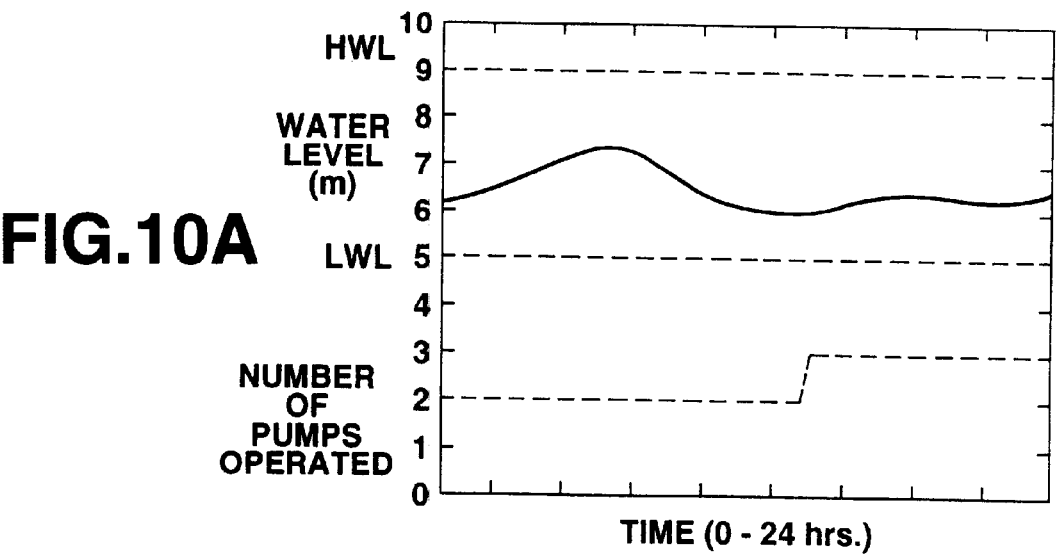
FIGS. 10A–10C are views similar to FIGS. 8A–8B, showing the results of control of the third embodiment.
Figure 10B:
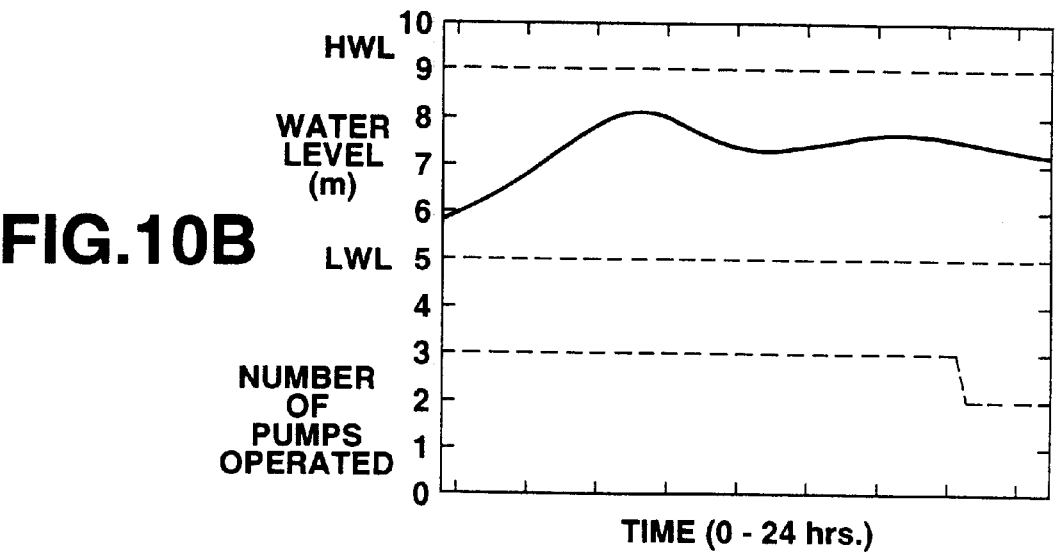
Figure 10C:
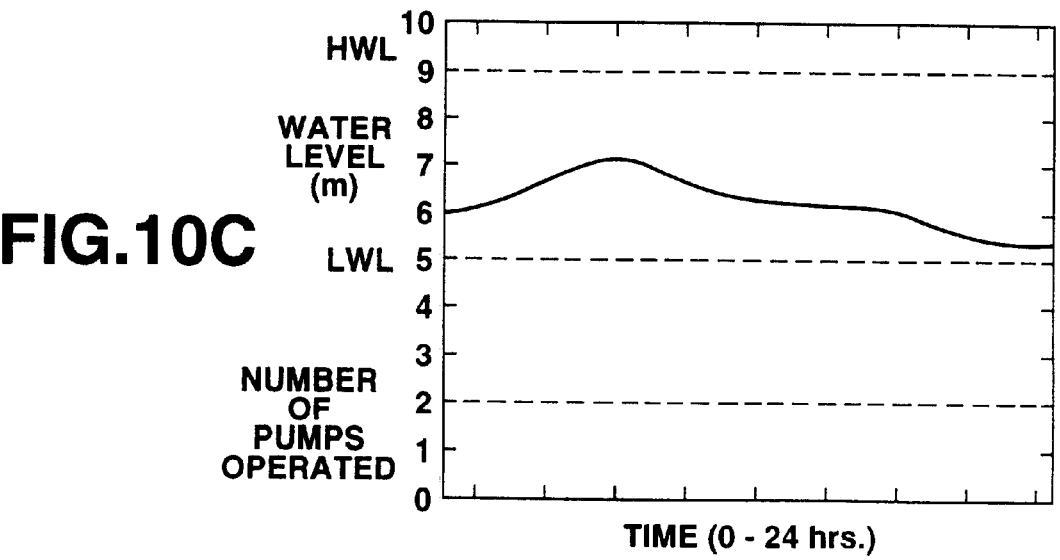
Figure 11:
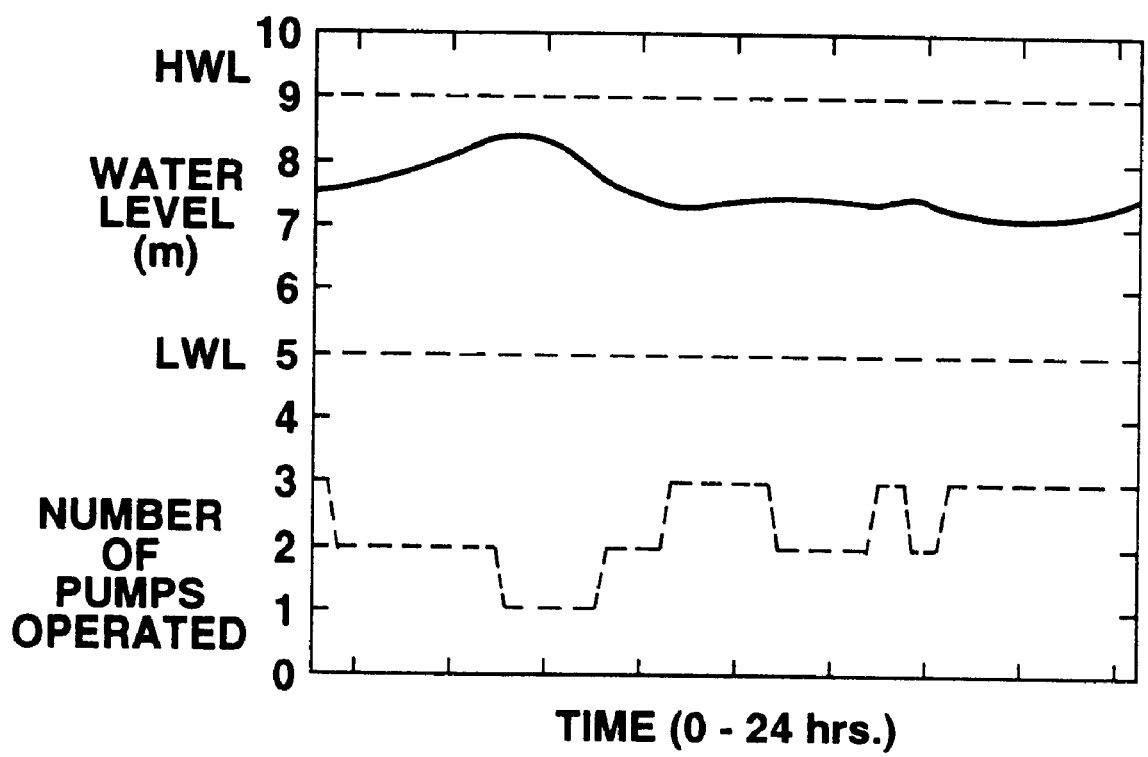
FIG. 11 is a view similar to FIGS. 10A–10C, showing the results of control of the prior art.

Referring to FIGS. 10A–10C, the results of control of the third embodiment and the prior art as shown in FIG. 11 will be compared with each other. Referring to FIGS. 10A–10C, set values in the third embodiment are as follows. The highest set water level HWL is 9 m, the lowest set water level LWL is 5 m, a unit time is 1 hr., a predicted effective number ET is 8, the control period is 1 hr., a waiting time up to pump start after pump start determination is 30 min., and the effective depth of the distributing reservoir 11 is 10 m. For prediction of the water delivery, the water delivery per hour during 2 months before start of control is input to the short-term demand prediction part 18.

FIG. 10A shows data on a day having start of the water pumps 13, indicating that pump start occurs 30 min. after pump start determination. FIG. 10B shows data on a day having stop of the water pumps 13, indicating that pump stop 13 occurs 30 min. after pump stop determination. FIG. 10C shows data on a day having no start/stop of the water pumps 13, indicating that the water level varies in this way when no pump start/stop is needed.

FIG. 11 shows data on a typical day in the prior art, indicating that the water level varies in accordance with variations in the water delivery, and pump start/stop occurs in accordance therewith. Pump start occurs 30 min. after pump start determination, and pump stop occurs 30 min. after pump stop determination. On this day, the number of times of pump start is 4, and the number of times of pump stop is 4.

Figure 12A:
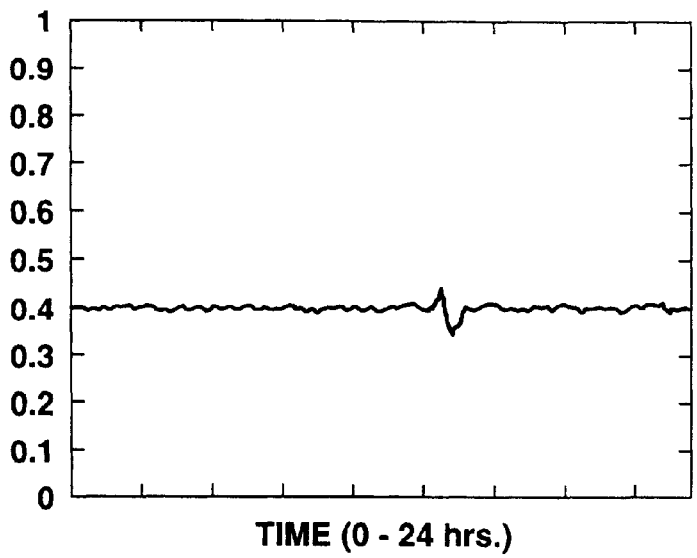
FIGS. 12A–12C are views similar to FIG. 11, showing variations in chlorine concentration.
Figure 12B:
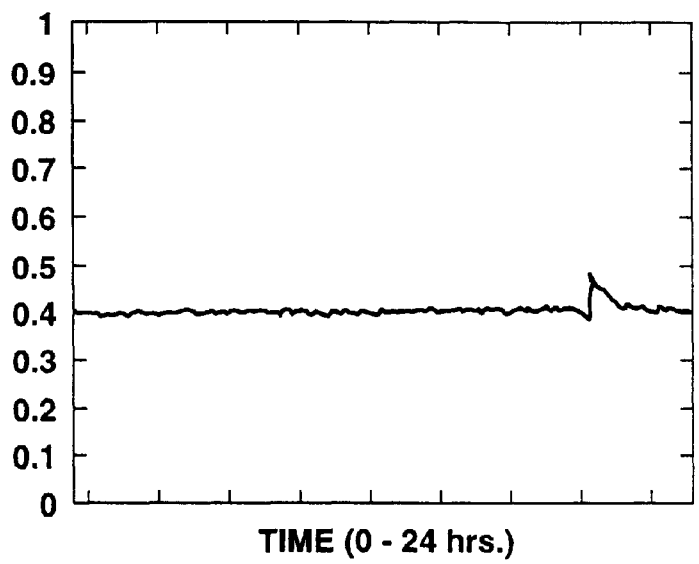
Figure 12C:
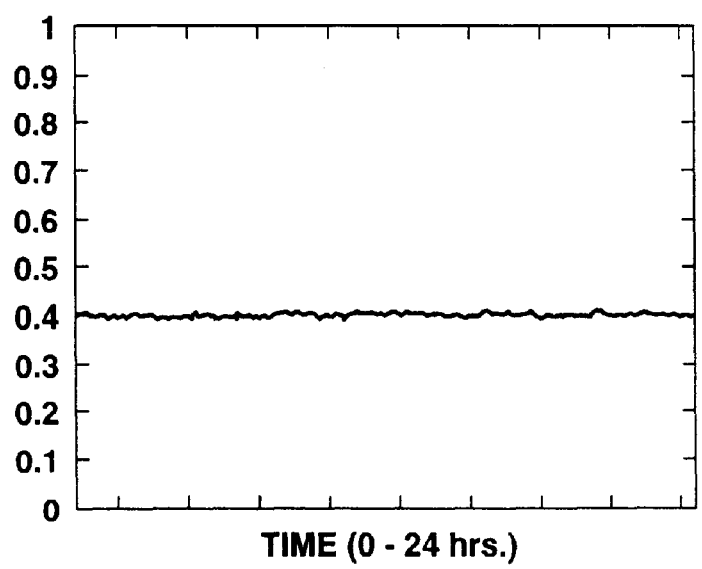
Figure 13:
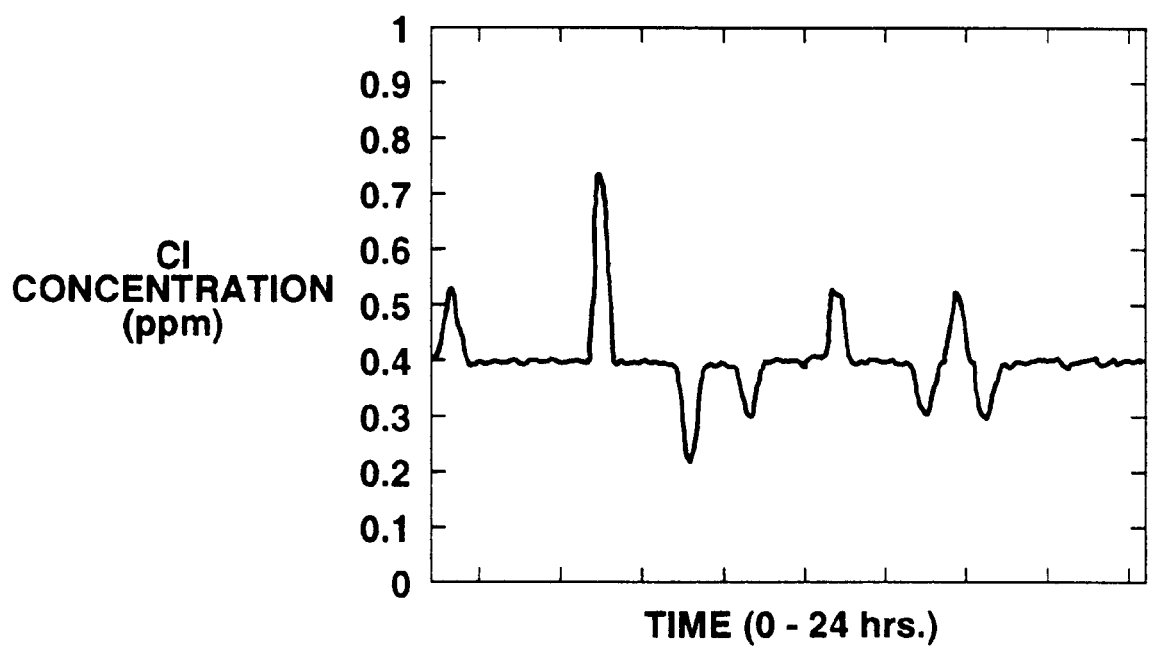
FIG. 13 is a view similar to FIGS. 12A–12C, showing variations in chlorine concentration.

The third embodiment studies data on 14 successive days. The number of times of pump start is 5. The study reveals that though with lag of flow change of the chlorine injection equipment 25, control of the distributing reservoir 11 based on short-term demand prediction is very excellent. Moreover, due to less number of times of pump start/stop as shown in FIGS. 10A–10B, the number of times of change in the injection quantity of the chlorine injection equipment 25 is smaller as shown in FIGS. 12A–12B. On the day when no pump start/stop occurs as shown in FIG. 10C, the injection quantity of the chlorine injection equipment 25 varies as shown in FIG. 12C, enabling water distribution with stable chlorine concentration. Likewise, the prior art studies data on 14 successive days in a period with the total water delivery similar to that of the third embodiment. The number of times of pump start is 57. Since the injection quantity of the chlorine injection equipment 25 should be changed upon pump start/stop, greater number of times of pump start/stop as shown in FIG. 11 causes greater variations in chlorine concentration in distributed water as shown in FIG. 13.

Next, the effect of the third embodiment will be described. According to the third embodiment, the number of times of pump start is only 5 during 14 days even in the installation wherein immediate pump start is not possible, which means not only excellent control in view of durability of the water pumps 13 and energy saving as in the first embodiment, but stable running of the chlorine injection equipment 25. Further, the number of pumps 13 operated is only 2—3 as in the first embodiment, resulting in pump operation with the highest efficiency and stable water receiving from the filtration plant, i.e. excellent running of the water distributing installation. Furthermore, short-term demand prediction is based on a method of pattern classification of past data, which enables excellent running of the water distributing installation as other prediction method ensures.

Figure 14:
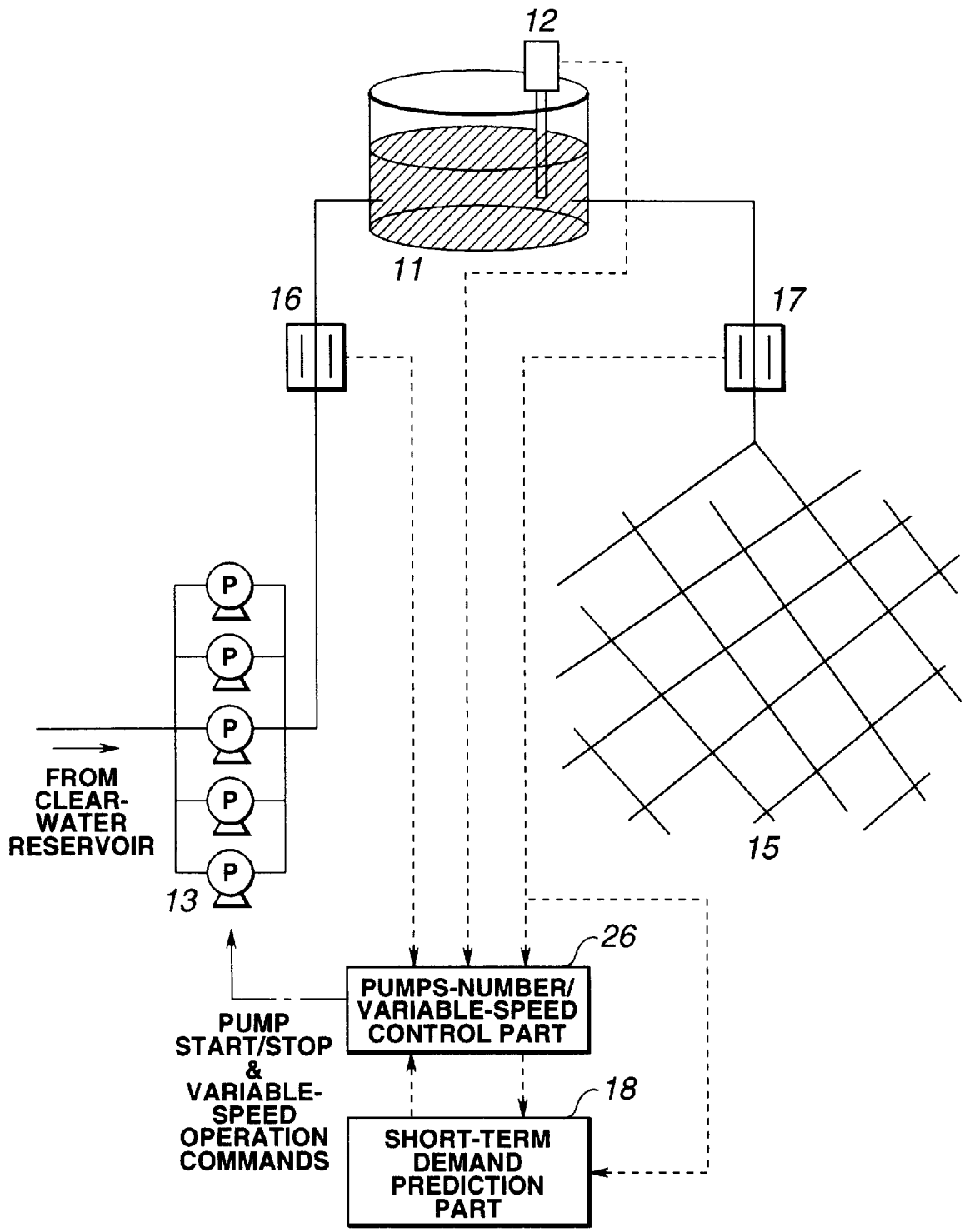
FIG. 14 is a view similar to FIG. 9, showing a fourth embodiment of the present invention.

FIGS. 14–17 show a fourth embodiment of the present invention. FIG. 14 shows a water distributing installation wherein the water distributing installation controller is applied to pumps number/variable rotating-speed control. Referring to FIG. 14, water pumps 13 are arranged to supply clear water temporarily accumulated in a clear-water reservoir, not shown, to a distributing reservoir 11. The water pumps 13 are controlled by a pumps number/variable rotating-speed control part 26 for operation at variable rotating speed. The pumps number/variable rotating-speed control part 26 provides a pump start/stop command and a variable rotating-speed operation command.

The pumps number/variable rotating-speed control part 26 receives an electric signal derived from a level gauge 12, an electric signal derived from a first flowmeter 16 for measuring the water supply of the water pumps 13, and an electric signal derived from a second flowmeter 17 for measuring the water delivery of the distributing reservoir 11. The pumps number/variable rotating-speed control part 26 determines start/stop of the water pumps 13 in accordance with those electric signals, i.e. the water level, the water supply, the water delivery, and short-term demand prediction data so as to control the water pumps 13. The short-term demand prediction data are output from a short-term demand prediction part 18.

The short-term demand prediction part 18 provides prediction data on the demand of the distributing area obtained in the same way as in the first embodiment to the pumps number/variable rotating-speed control part 26 at the request thereof. The pumps number/variable rotating-speed control part 26 comprises a predicted water-level calculation part and a pump-control command-value determination part. The operation of the predicted water-level calculation part is not described here since it operates in the same way as that in the first embodiment. The operation of the pump-control command-value determination part will be described hereafter.

The pump-control command-value determination part carries out control of decreasing one water pump 13 when the predicted water level is higher than a highest set water level HWL within the range of a preset prediction effective number ET, and control of increasing one water pump 13 when the predicted water level is lower than a lowest set water level LWL within the range of the preset prediction effective number ET. Moreover, the pump-control command-value determination part carries out control of decreasing the rotating speed of the water pumps 13 when the predicted water level is higher than HWL within the range of a preset prediction effective number VT used for variable rotating-speed control, and control of increasing the rotating speed of the water pumps 13 when the predicted water level is lower than LWL within the range of the preset prediction effective number VT. The operation amount of the variable rotating speed of the water pumps 13 is given by the following formula which integrates errors of the predicted water level, i.e. deviations from the control range, within VT:

$$\text{Operation amount }(\%) = \Sigma(\text{ERROR}) \times \text{GAIN} \times 100$$

where GAIN is a gain of variation of the variable rotating speed.

Figure 16:
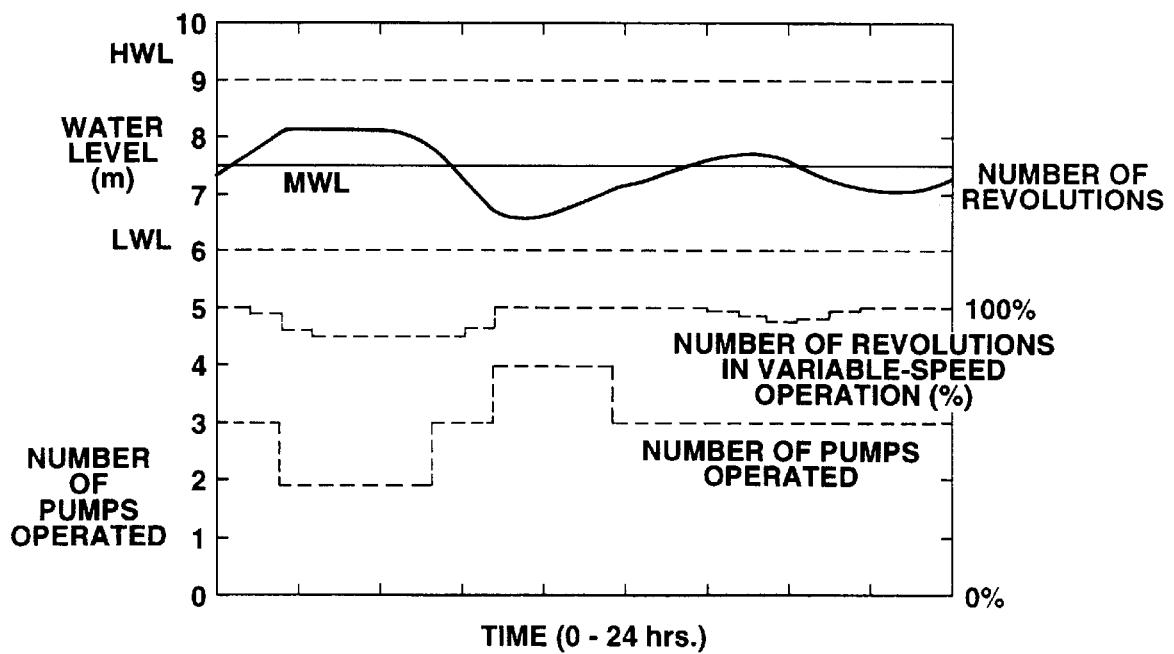
FIG. 16 is a view similar to FIG. 15, showing the results of control of the prior art.

In order to compare control of the fourth embodiment and that of the prior art as shown in FIG. 16, a description will be made with regard to a water distributing installation adopting the pumps number/variable rotating-speed control in place of the pumps-number control part as shown in FIG. 21. With this water distributing installation, when the water level of the distributing reservoir 1 is higher than the first controlled water level LT1, the number of pumps 3 operated is one. It is noted that LT1 is equal to the highest set water level HWL.

When the water level is higher than the second controlled water level LT2, the number of pumps 3 operated is determined to two by the following formula:

$$LT2 = ((HWL - LWL)/3) \times 1 - HWL$$

When the water level is between the second controlled water level LT2 and the third controlled water level LT3, the number of pumps 3 operated is determined to three by the following formula:

$$LT3 = ((HWL - LWL)/3) \times 2 - HWL$$

Likewise, when the water level is between LT4 and LT3, the number of pumps 3 operated is four. It is noted that LT4 is equal to the lowest set water level LWL. When the water level is lower than LT4, the number of pumps 3 operated is five.

A variation of the rotating speed of the water pumps 3 is determined by the following formula:

$$\text{Operation amount }(\%) = \text{ERROR}(T) \times \text{GAIN}(T) \times 100$$

where ERROR(T) is an error of the water level or a deviation from the control range, and GAIN(T) is a gain of variation of the variable rotating speed.

Figure 15:
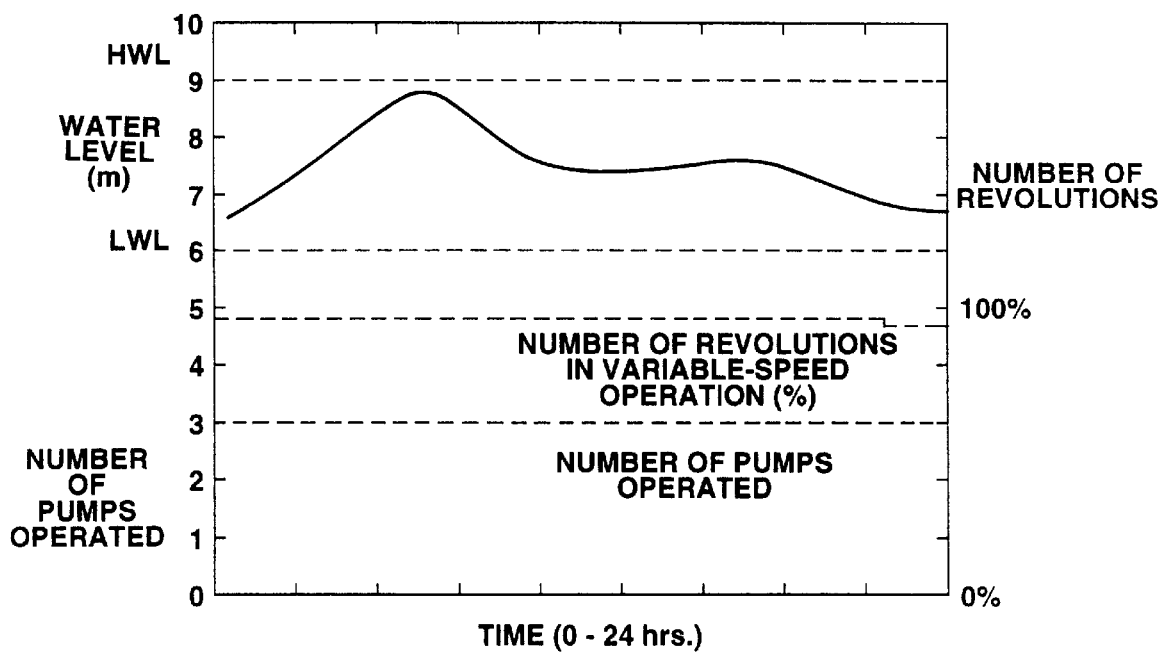
FIG. 15 is a view similar to FIG. 13, showing the results of control of the fourth embodiment.

Referring to FIGS. 15–16, the results of control of the fourth embodiment and the prior art will be compared with each other. Referring to FIG. 15, set values in the fourth embodiment are as follows. The highest set water level HWL is 9 m, the lowest set water level LWL is 5 m, a unit time is 1 hr., a predicted effective number ET used for pumps-number control is 3, a predicted effective number VT used for variable rotating-speed control is 8, the control period is 1 hr., GAIN(T) is 0.05, and the effective depth of the distributing reservoir 11 is 10 m. For prediction of the water delivery, the water delivery per hour during 1.5 month before start of control is input to the short-term demand prediction part 18. Referring to FIG. 16, set values in the prior art are as follows. HWL is 9 m, LWL is 6 m, a center of the set water level MWL is 7.5 m, and the control period is 1 hr, and GAIN(T) is 0.1.

Referring to FIG. 15, the results of control of the fourth embodiment will be described. It is understood from FIG. 15 that pump start/stop does not occur, and a variable rotating-speed operation command is changed from 97% to 95% at 22. The water level varies gently within the control range. During 14 successive days, the number of times of pump start is 0, and the number of times of generation of a variable rotating-speed operation command is 30.

Referring to FIG. 16, the results of control of the prior art will described. It is understood from FIG. 16 that the water level varies in accordance with variations in the water delivery, and that pump start/stop occurs whenever the water level exceeds set values such as LT3 to keep it within the control range, having increasing numbers of times of pump start/stop and generation of a variable rotating-speed operation command. During 14 successive days, the number of times of pump start/stop is 79, and the number of times of generation of a variable rotating-speed operation command is 160.

Figure 17:
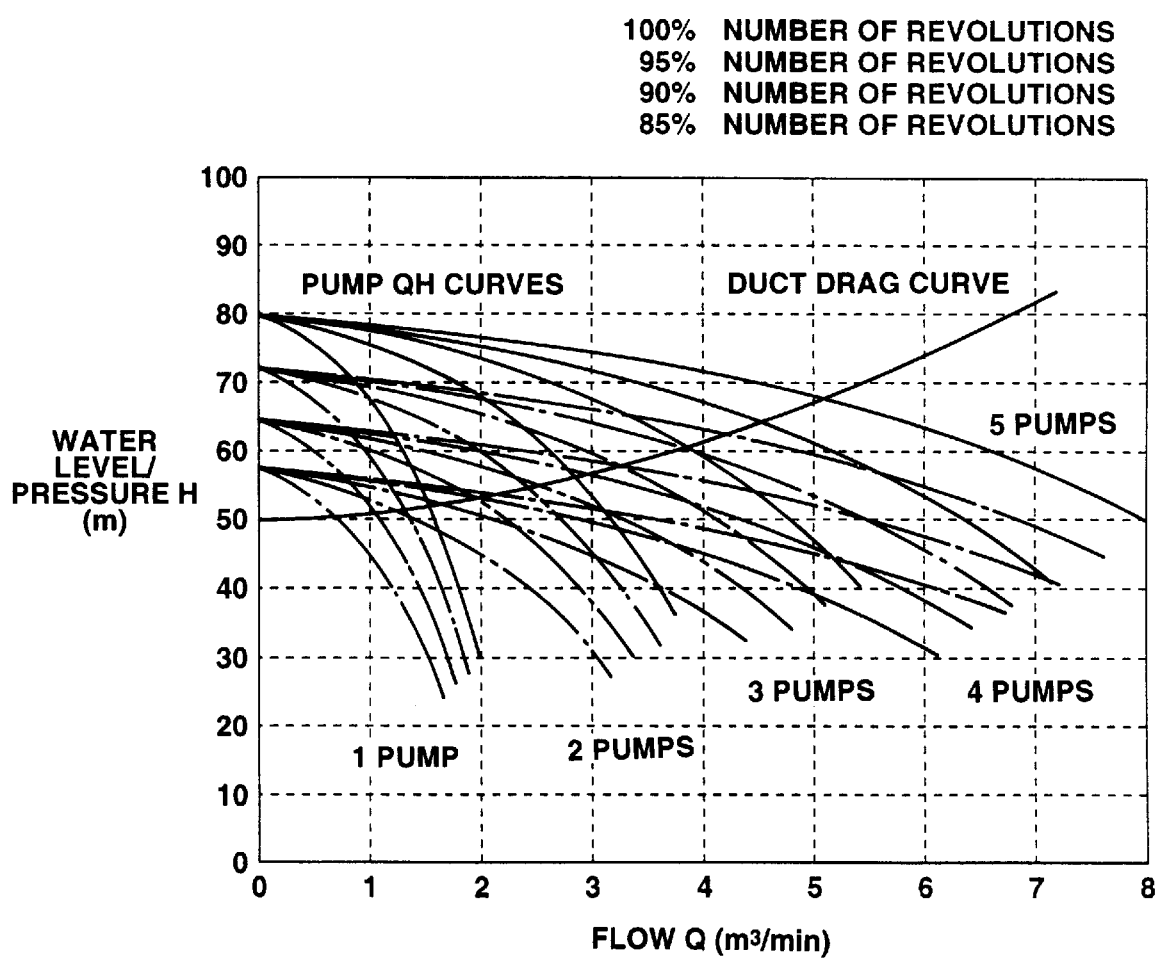
FIG. 17 is a view similar to FIG. 16, showing flow vs. water level/pressure curves for five pumps studied in the fourth embodiment and the prior art, with all pumps put in variable rotating-speed operation.

FIG. 17 shows flow vs. water level/pressure curves for five pumps studied in the fourth embodiment and the prior art, with all pumps put in variable rotating-speed operation. Referring to FIG. 17, the QH curves correspond to 100% rotating speed, 95% rotating speed, 90% rotating speed, and 85% rotating speed from the top. The fourth embodiment adopts the general configuration including the water pumps 13 in parallel operation and a common water duct, wherein in view of the duct drag, the water supply acceleratedly reaches the ceiling as the number of pumps 13 operated is increased. That is, the efficiency of each water pump 13 is lowered with the water supply reducing acceleratedly.

Therefore, in view of energy saving, the pump operation is carried out, preferably, with less change of the number of pumps 13 operated, the minimum number thereof for enabling the average of water supply, and the flow finely adjusted by variable rotating-speed operation. This corresponds, in the fourth embodiment, to the state that the operation of three water pumps 13 is continuously carried out with the flow adjusted by variable rotating-speed operation. Variable rotating-speed operation, which is excellent in energy efficiency, contributes to improvement in the control accuracy with little lowering of the energy efficiency.

In the fourth embodiment, the water distributing installation receives clear water from a filtration plant for water distribution. In view of the structure, the filtration plant ensures, preferably, stable supply of a substantially given quantity of clear water, so that the state of the fourth embodiment wherein the operation of three pumps 13 is continuously carried out with the flow adjusted by variable rotating-speed operation produces a great effect in terms of stable running of the filtration plant.

Next, the effect of the fourth embodiment will be described. According to the fourth embodiment, the number of times of pump start is 0 during 14 days, which means excellent control in view of not only durability of the water pumps 13 and the associated devices, but energy saving in terms of a greater quantity of electricity upon pump start. Further, the number of times of generation of a variable rotating-speed command is only 30 during 14 days, resulting in stable water supply. Furthermore, the number of pumps 13 operated is only 3 with the flow adjusted by variable rotating-speed operation, resulting in pump operation with the highest efficiency and stable water receiving from the filtration plant, i.e. excellent running of the water distributing installation.

Figure 18:
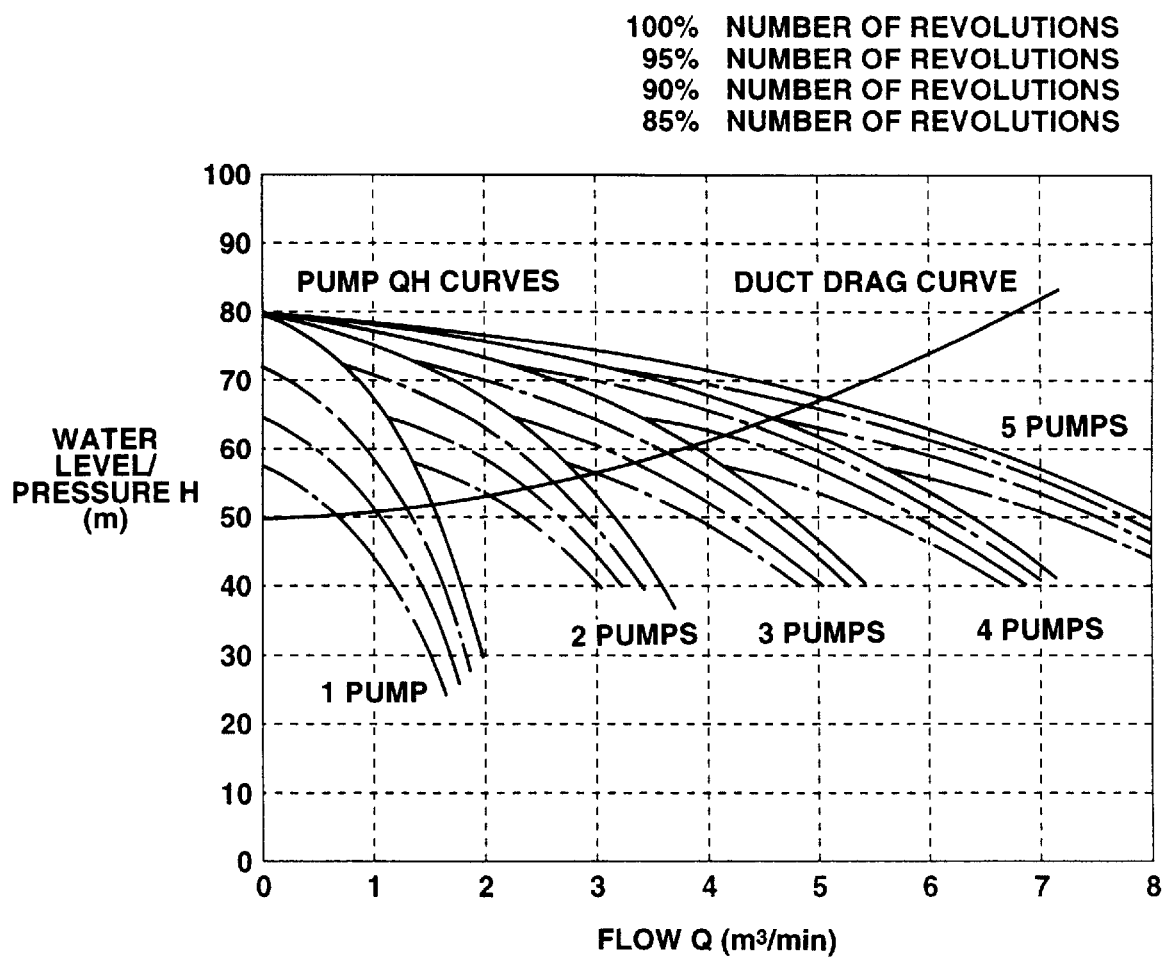
FIG. 18 is a view similar to FIG. 17, showing flow vs. water level/pressure curves for five pumps studied in the fifth embodiment, with one pump put in variable rotating-speed operation.
Figure 19:
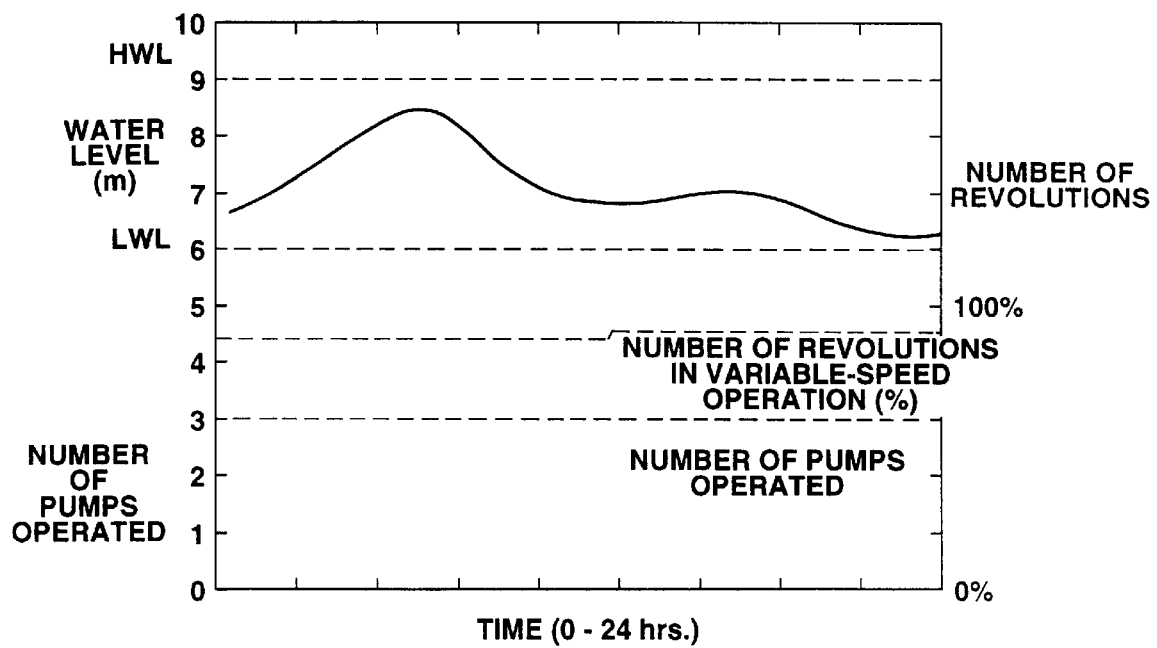
FIG. 19 is a view similar to FIG. 18, showing the results of control of the fifth embodiment.
Figure 20:
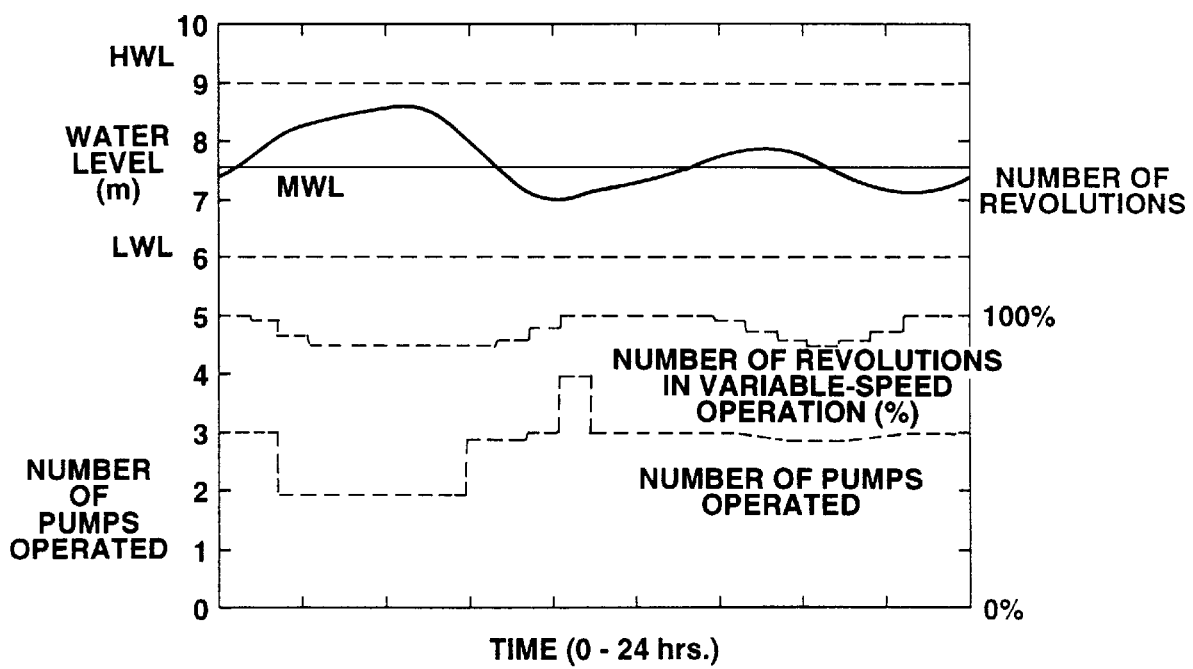
FIG. 20 is a view similar to FIG. 19, showing the results of control of the prior art.

FIGS. 18–20 show a fifth embodiment of the present invention which is substantially the same as the fourth embodiment except that the number of pumps 13 put in variable rotating-speed operation is 1. FIG. 18 shows the water supply ensured by the water pumps 13 in this embodiment. In the fifth embodiment, the short-term demand prediction part 18 and the pumps number/variable rotating-speed control part 26 operate in substantially the same way as those in the fourth embodiment except to put one pump 13 in variable rotating-speed operation.

Referring to FIGS. 19–20, the results of control of the fifth embodiment and the prior art will be compared with each other. In the fifth embodiment, as seen from FIG. 19, pump start/stop does not occur, and a variable rotating-speed operation command is changed from 90% to 92% at 14. The water level varies gently within the control range. During 14 successive days, the number of times of pump start is 0, and the number of times of generation of a variable rotating-speed operation command is 25.

In the prior art, as seen from FIG. 20, the water level varies in accordance with variations in the water delivery, and pump stop occurs whenever the water level exceeds set values such as LT3. The water level varies gently within the control range, but the numbers of times of pump start/stop and generation of a variable rotating-speed command are greater. By way of example, during 14 successive days, the number of times of pump start is 58, and the number of times of generation of a variable rotating-speed operation command is 188.

It is thus understood that the fifth embodiment ensures the stable operation of the water pumps 13 with energy saving, resulting in stable running of the water distributing installation.

It is noted that pumps number/variable rotating-speed operation control in the fourth and fifth embodiments is applicable to the pumps-number control part 14 in the third embodiment.

Having described the present invention with regard to the preferred embodiments, it is noted that the present invention is not limited thereto, and various changes and modifications can be made without departing from the scope of the present invention.

What is claimed is:

1. A system for controlling a water distributing installation with a filtration plant and a reservoir for distributing water to an area, the system comprising:

means for supplying water from the filtration plant to the reservoir, said supplying means including at least one pump;

a level gauge arranged in the reservoir to measure a water level in the reservoir;

a first flowmeter arranged between the reservoir and said supplying means to measure a water supply directed to the reservoir;

a second flowmeter arranged between the reservoir and the area to measure a water delivery directed to the area;

a short-term demand prediction part that receives said water delivery, said short-term demand prediction part accumulating in a time-series way said water delivery as integrated data per unit time and embedding past time-series data on said water delivery in a state space of n dimension and t hours lagged so as to form short-term demand prediction data; and a controller that receives said water level, said water supply, said water delivery and said short-term demand prediction data, said controller controlling said at least one pump, said controller including a first part for calculating a predicted water level after one unit of time in accordance with said short-term demand prediction data, a second part for controlling said supplying means in accordance with said predicted water level wherein said second part decreases a pumping rate of one pump when said predicted water level is higher than a highest set water level within a range of a preset prediction effective number and increases a pumping rate of one pump when said predicted water level is lower than a lowest set water level within said range of said preset prediction effective number, and a third part for decreasing rotating speed of said at least one pump when said predicted water level is higher than said highest set water level within said range of said preset prediction effective number and increasing said rotating speed of said at least one pump when said predicted water level is lower than said lowest set water level within said range of said preset prediction effective number.

2. A system as claimed in claim 1, wherein said short term prediction part is operated in accordance with a short-term prediction based on chaos theory.

3. A system as claimed in claim 1, further comprising:

a chlorine injection element connected to said controller, said chlorine injection element injecting chlorine into a chlorine mixing reservoir when said controller starts and stops said at least one pump, wherein the start and stop of said at least one pump is lagged by a predetermined period of time to correspond to a time necessary for said chlorine injection element to change an injection quantity of chlorine.

4. A system for controlling a water distributing installation with a filtration plant and a reservoir for distributing water to an area, the system comprising:

means for supplying water from the filtration plant to the reservoir, said supplying means including at least one valve;

a level gauge arranged in the reservoir to measure a water level in the reservoir;

a first flowmeter arranged between the reservoir and said supplying means to measure a water supply directed to the reservoir;

a second flowmeter arranged between the reservoir and the area to measure a water delivery directed to the area;

a short-term demand prediction part that receives said water delivery, said short-term demand prediction part accumulating in a time-series way said water delivery as integrated data per unit time and embedding past time-series data on said water delivery in a state space of n dimension and t hours lagged so as to form short-term demand prediction data; and a controller that receives said water level, said water supply, said water delivery and said short-term demand prediction data, said controller controlling an opening degree of said at least one valve, said controller including a first part for calculating a predicted water level after a first unit of time in accordance with said short-term demand prediction data and a second part that closes said at least one valve by a predetermined amount when said predicted water level is higher than a highest set water level within a range of a preset prediction effective number and opens said at least one valve by a predetermined amount when said predicted water level is lower than a lowest set water level within said range of said preset prediction effective number.

5. A system as claimed in claim 1, wherein an amount of said rotating speeds operated by said third part is given by:

$$\text{Amount } (\%) = \Sigma(\text{ERROR}) \times \text{GAIN} \times 100$$

where ERROR is an error of said water level, and GAIN is a gain of variation of said rotating speed.

6. A system for controlling a water distributing installation with a filtration plant and a reservoir for distributing water to a demand area, the system comprising:

a plurality of pumps that supplies water from the filtration plant to the reservoir;

a level gauge arranged in the reservoir to measure a water level in the reservoir;

a first flowmeter arranged between the reservoir and the plurality of pumps to measure a water supply directed to the reservoir;

a second flowmeter arranged between the reservoir and the area to measure a water delivery directed to the demand area;

a prediction part that receives the water delivery, the prediction part accumulating in a time-series way the water delivery as integrated data per unit time and embedding past time-series data on the water delivery in a state space of n dimension and t hours lagged so as to form short-term demand prediction data; and a pump control part that receives the water level, the water supply, the water delivery and the short-term demand prediction data, the pump control part including a first part for calculating a predicted water level after one unit of time in accordance with the short-term demand prediction data, a second part for controlling the plurality of pumps in accordance with the predicted water level wherein the second part decreases a pumping rate of one pump when the predicted water level is higher than a highest set water level within a range of a preset prediction effective number and increases a pumping rate of one pump when the predicted water level is lower than a lowest set water level within the range of the preset prediction effective number, and a third part for decreasing rotating speeds of the plurality of pumps when the predicted water level is higher than the highest set water level within the range of the preset prediction effective number and increasing the rotating speeds of the plurality of pumps when the predicted water level is lower than the lowest set water level within the range of the preset prediction number.

7. A system for controlling a water distributing installation with a filtration plant and a reservoir for distributing water to a demand area, the system comprising:

a valve controlling a water supply from the filtration plant to the reservoir;

a level gauge arranged in the reservoir to measure a water level of the reservoir;

a first flowmeter arranged between the reservoir and the valve to measure a water supply supplied to the reservoir;

a second flowmeter arranged between the reservoir and the area to measure a water delivery delivered to the demand area;

a prediction part, the prediction part accumulating in a time-series way the water delivery as integrated data per unit time and embedding past time-series data on the water delivery in a state space of n dimension and t hours lagged so as to form short-term demand prediction data; and a valve control part that receives the water level, the water supply, the water delivery and the short-term demand prediction data, the valve control part including a first part for calculating a predicted water level after one unit of time in accordance with the short-term demand prediction data and a second part for controlling an opening degree of the valve in accordance with the predicted water level.

8. A system for controlling a water distributing installation with a filtration plant and a reservoir for distributing water to a demand area, the system comprising:

a plurality of pumps that supply water from the filtration plant to the reservoir;

a level gauge arranged in the reservoir to measure a water level in the reservoir;

a first flowmeter arranged between the reservoir and the plurality of pumps to measure a water supply supplied to the reservoir;

a second flowmeter arranged between the reservoir and the demand area to measure a water delivery delivered to the demand area;

a prediction part, the prediction part accumulating in a time-series way the water delivery as integrated data per unit time and embedding past time-series data on the water delivery in a state space of n dimension and t hours lagged so as to form short-term demand prediction data; and a pump control part that receives the water level, the water supply, the water delivery and the short-term demand prediction data, the pump control part including a first part for calculating a predicted water level after one unit of time in accordance with the short-term demand prediction data, a second part for controlling the plurality of pumps in accordance with the predicted water level wherein the second part decreases a pumping rate of one pump when the predicted water level is higher than a highest set water level within a range of a preset prediction effective number and increases a pumping rate of one pump when the predicted water level is lower than a lowest set water level within the range of the preset prediction effective number, and a third part for decreasing rotating speeds of the plurality of pumps when the predicted water level is higher than the highest set water level within the range of the preset prediction effective number and increasing the rotating speeds of the plurality of pumps when the predicted water level is lower than the lowest set water level within the range of the preset prediction effective number; and a chlorine injection equipment connected to the pump control part, the chlorine injection equipment injecting chlorine into a chlorine mixing reservoir when the pump control part starts and stops the plurality of pumps, wherein the start and stop of the plurality of pumps is lagged by a predetermined period of time to correspond to a time necessary for the chlorine injection equipment to change an injection quantity of chlorine.

9. A system for controlling a water distributing installation with a filtration plant and a reservoir for distributing water to a demand area, the system comprising:

a first device that supplies a water supply from the filtration plant to the reservoir, the first device including at least one pump;

a level gauge arranged in the reservoir to measure a water level in the reservoir;

a first flowmeter arranged between the reservoir and the first device to measure a water supply supplied to the reservoir;

a second flowmeter arranged between the reservoir and the demand area to measure a water delivery delivered to the demand area;

a second device that receives the water delivery, the second device accumulating in a time-series way the water delivery as integrated data per unit time and embedding past time-series data on the water delivery in a state space of n dimension and t hours lagged so as to form short-term demand prediction data; and a third device that receives the water level, the water supply, the water delivery and the short-term demand prediction data, the third device controlling the at least one pump, the third device including a first part for calculating a predicted water level after one unit of time in accordance with the short-term demand prediction data, a second part for controlling the first device in accordance with the predicted water level wherein the second part decreases a pumping rate of one pump when the predicted water level is higher than a highest set water level within a range of a preset prediction effective number and increases a pumping rate of one pump when the predicted water level is lower than a lowest set water level within the range of the preset prediction effective number, and a third part for decreasing rotating speed of the at least one pump when the predicted water level is higher than the highest set water level within the range of the preset prediction effective number and increasing the rotating speed of the at least one pump when the predicted water level is lower than the lowest se water level within the range of the preset prediction effective number.

* * * * *